(12) United States Patent
Evans et al.

(10) Patent No.: US 10,324,260 B1
(45) Date of Patent: Jun. 18, 2019

(54) OPTICAL ASSEMBLY USING LOW DN/DT OPTICAL ADHESIVE

(71) Applicant: CORNING RESEARCH & DEVELOPMENT CORPORATION, Corning, NY (US)

(72) Inventors: Alan Frank Evans, Beaver Dams, NY (US); Shawn Michael O'Malley, Horseheads, NY (US); Aramais Robert Zakharian, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/197,472

(22) Filed: Nov. 21, 2018

Related U.S. Application Data

(60) Provisional application No. 62/745,573, filed on Oct. 15, 2018.

(51) Int. Cl.
*G02B 6/26* (2006.01)
*C09J 9/00* (2006.01)
(Continued)

(52) U.S. Cl.
CPC ............... *G02B 6/262* (2013.01); *C09J 9/00* (2013.01); *C09J 11/04* (2013.01); *C09J 11/06* (2013.01); *C09J 11/08* (2013.01); *C09J 135/02* (2013.01); *G02B 6/02057* (2013.01); *G02B 6/26* (2013.01); *G02B 6/305* (2013.01); *G02B 6/3801* (2013.01)

(58) Field of Classification Search
None
See application file for complete search history.

(56) References Cited

U.S. PATENT DOCUMENTS 4,511,209 A * 4/1985 Skutnik ................. C03C 25/105
385/123
5,822,489 A * 10/1998 Hale ................... G02B 6/02033
385/145
(Continued)

OTHER PUBLICATIONS

Check et al; "Effects of Nanoparticles on Photopolymerization of Acrylate Monomers in Forming Nano-Composites", European Polymer Journal; 70 (2015) 166-172.
(Continued)

*Primary Examiner* — Michael Stahl
(74) *Attorney, Agent, or Firm* — Adam R. Weeks

(57) ABSTRACT

Embodiments of an optical assembly and methods of making it are provided. The optical assembly includes a first waveguide, a second waveguide, and an optical adhesive for transmitting optical signals between the first waveguide and the second waveguide. The adhesive includes about 20% to about 60% by volume of first monomers. The first monomers have at least two acrylate or methacrylate groups. The optical adhesive also includes about 40% to about 80% by volume of second monomers. The second monomers have at least one fluorine atom and at least one acrylate or methacrylate group. The optical adhesive has a refractive index of from about 1.40 to about 1.55, and in the temperature range of about 10° C. to about 85° C., the refractive index of the optical adhesive has a thermal drift dn/dT of less than the absolute magnitude of $|4 \times 10^{-4}/° C.|$ and the sign of that value is negative.

37 Claims, 13 Drawing Sheets

(51) Int. Cl.

| | |
|---|---|
| *G02B 6/38* | (2006.01) |
| *G02B 6/02* | (2006.01) |
| *C09J 135/02* | (2006.01) |
| *C09J 11/04* | (2006.01) |
| *C09J 11/06* | (2006.01) |
| *C09J 11/08* | (2006.01) |
| *G02B 6/30* | (2006.01) |

(56) References Cited

U.S. PATENT DOCUMENTS

| | | | |
|---|---|---|---|
| 6,599,957 B2 * | 7/2003 | Dawes ................ | C09D 4/06 385/141 |
| 6,744,951 B2 * | 6/2004 | Dawes ................ | C09D 4/06 385/129 |
| 2007/0284041 A1 | 12/2007 | Iida | |
| 2018/0072924 A1 | 3/2018 | Thompson et al. | |

OTHER PUBLICATIONS

Husar et al; "The Formulator's Guide to Anti-Oxygen Inhibition Additives"; Progress in Organic Coatings 77 (2014) 1789-1798.
Jamieson, T.H. "Thermal Effects in Optical Systems", Opt. Eng. (1961), 20(2): 156-160.
Optiwave Systems Inc.; Step Index Fiber—Fiber Parameters of SMF-28; 2019; 7 Pages https://optiwave.com/optibpm-manuals/bpm-step-index-fiber-fiber-parameters-of-smf-28/.

* cited by examiner

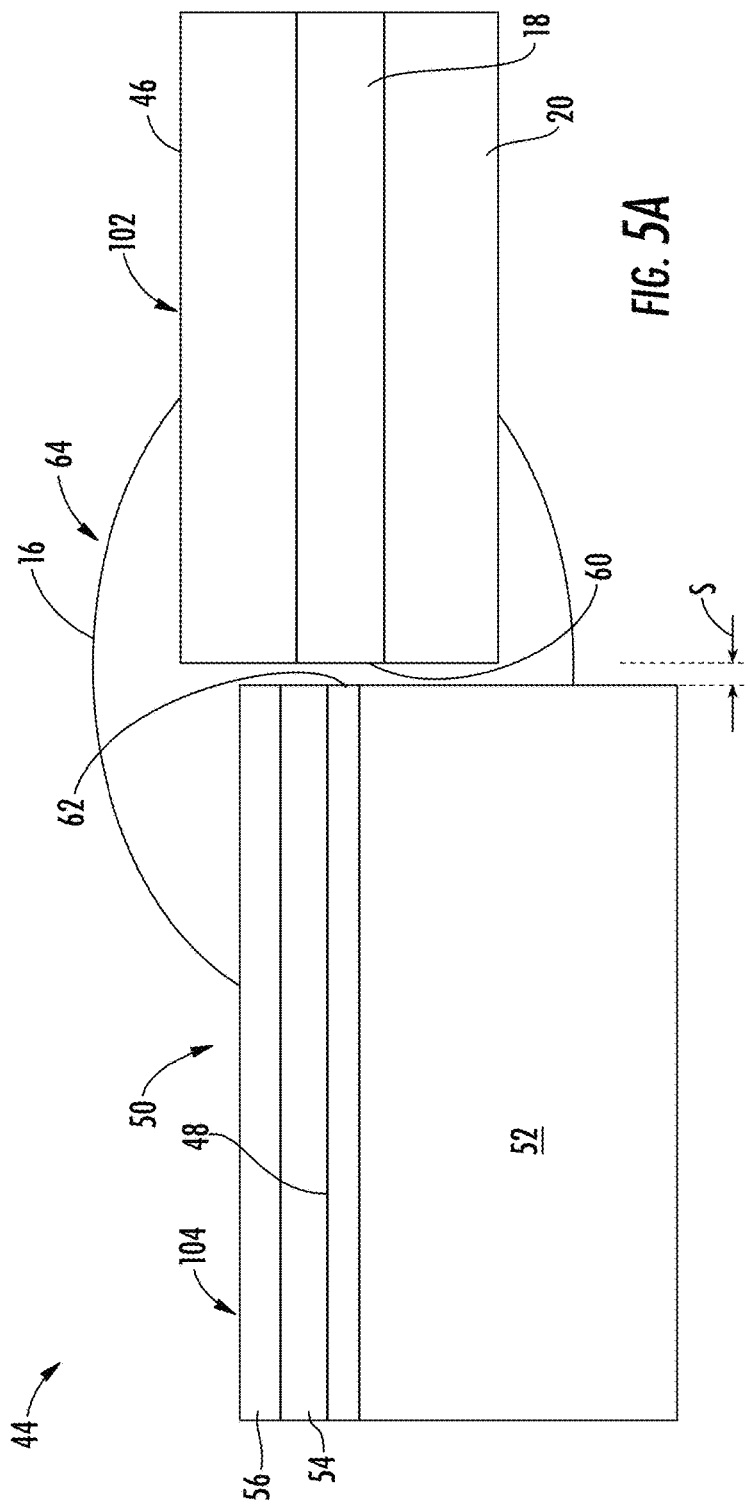
FIG. 5A
FIG. 5B

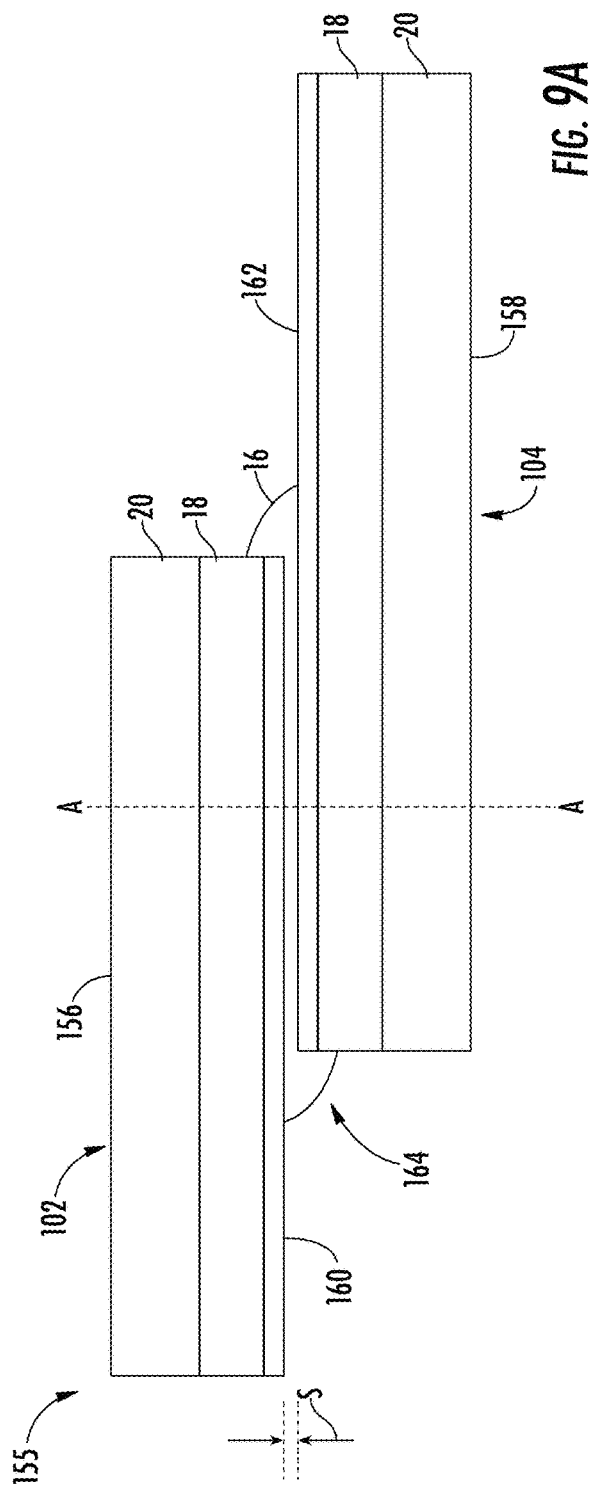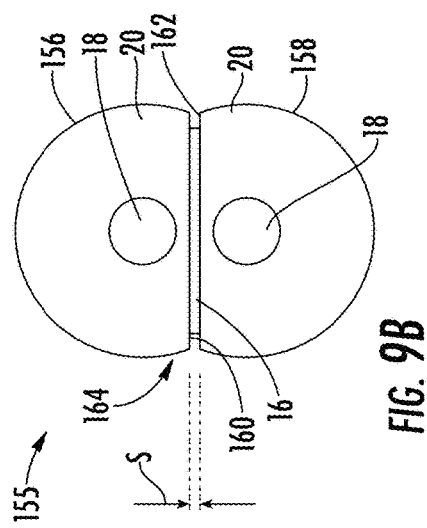

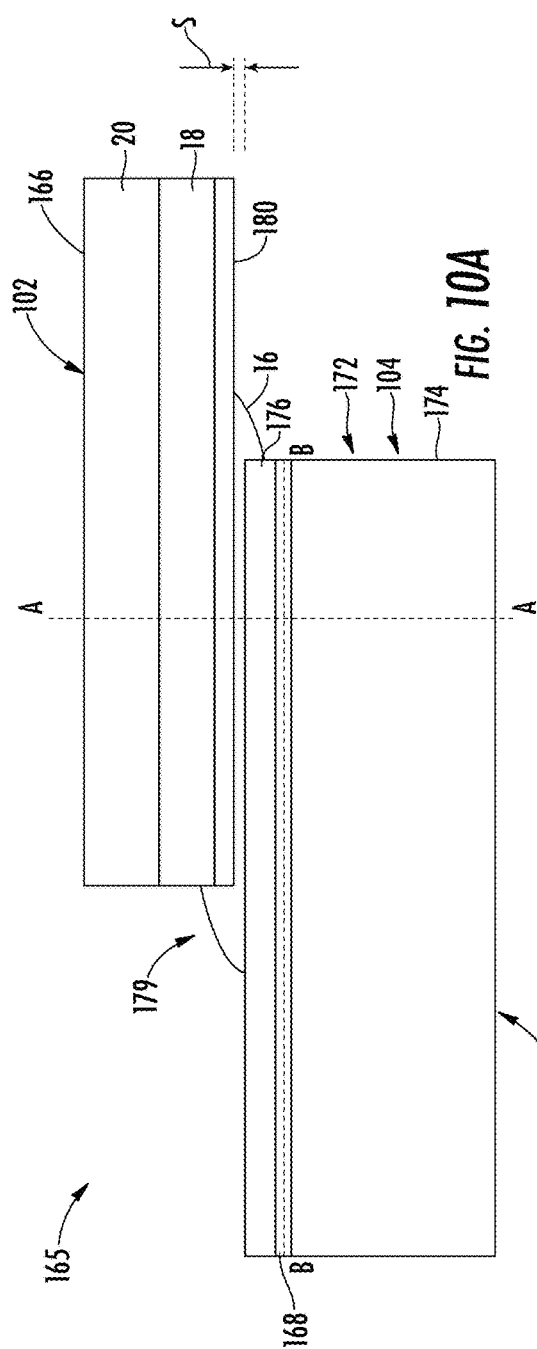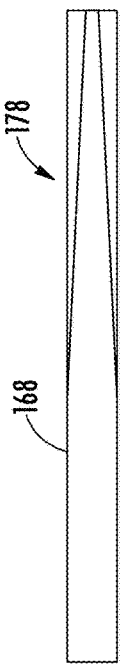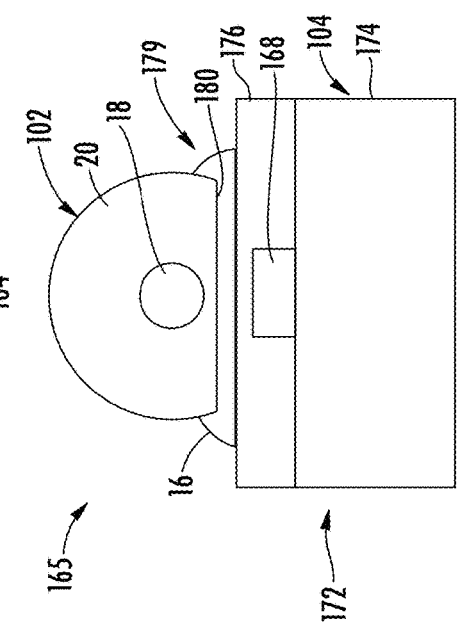

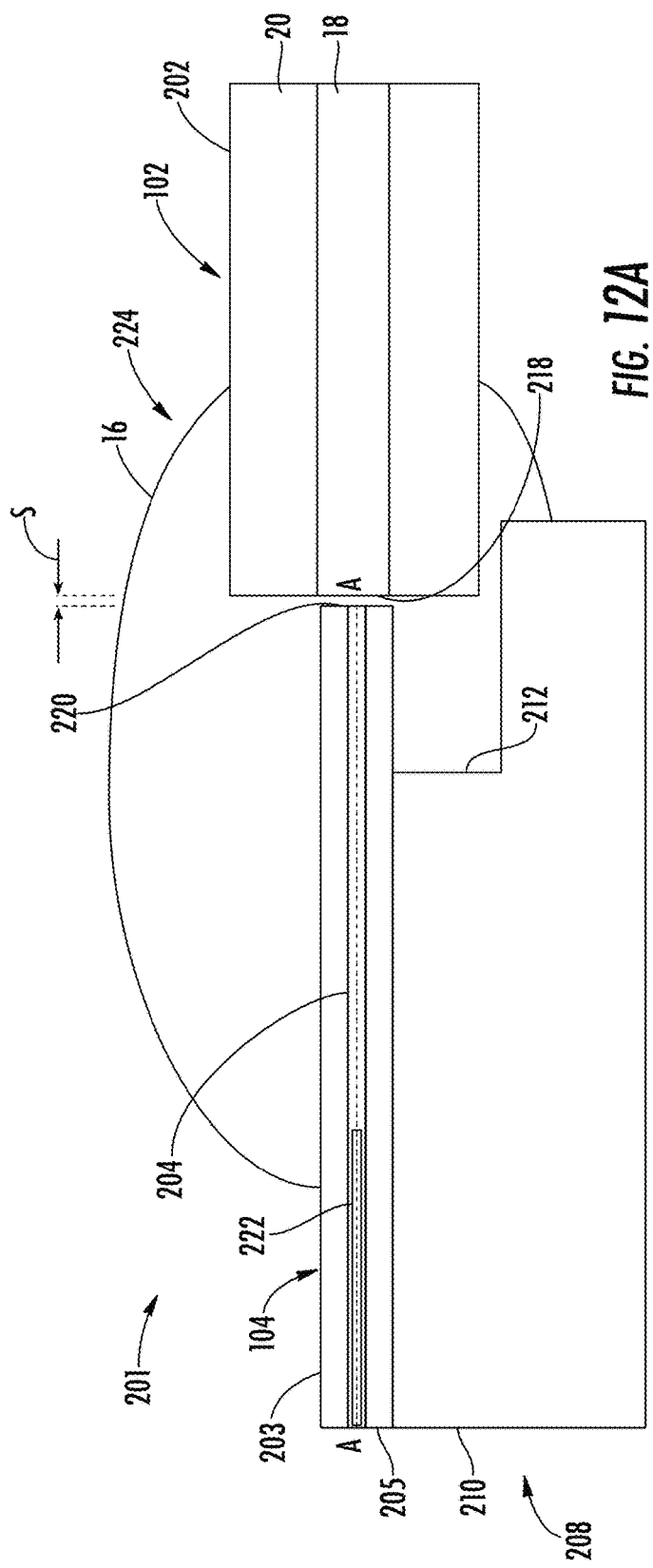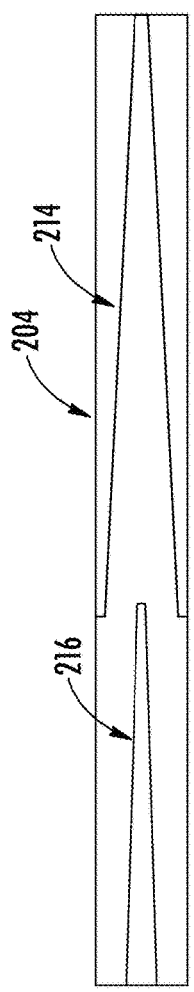
FIG. 12A
FIG. 12B

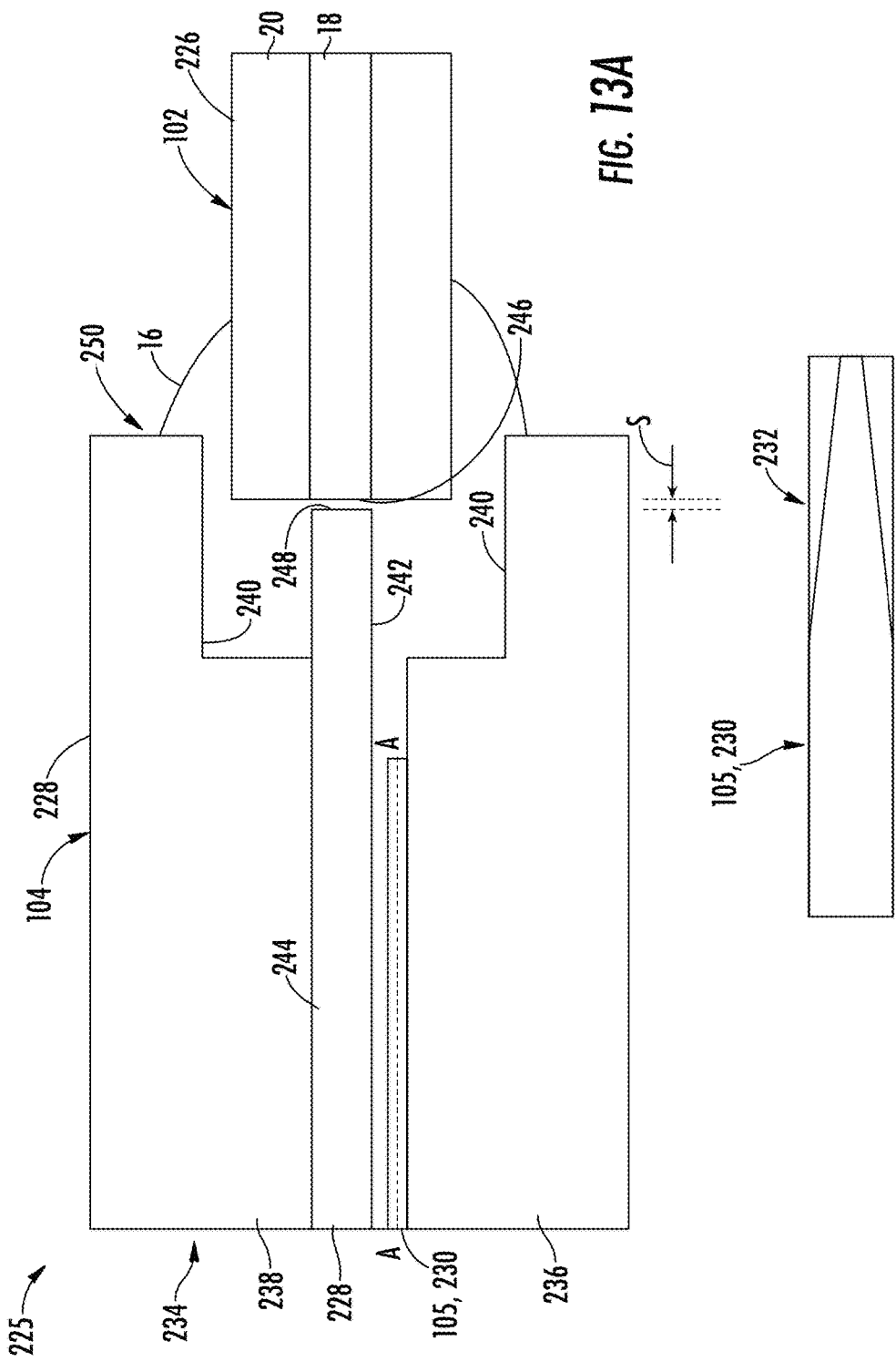

US 10,324,260 B1

OPTICAL ASSEMBLY USING LOW DN/DT OPTICAL ADHESIVE

PRIORITY APPLICATION

This application claims the benefit of U.S. Provisional Application No. 62/745,573, filed on Oct. 15, 2018, the content of which is relied upon and incorporated herein by reference in its entirety.

BACKGROUND

The disclosure relates generally to optical assemblies and more particularly to optical assemblies using adhesives that exhibit low thermal drift of their refractive index. In many applications, optical waveguides are coupled for transmission of signals therebetween. For example, two optical fibers may be coupled, an optical fiber may be coupled to a photonic waveguide, or two photonic waveguides may be coupled for transmission of signals therebetween. The optical properties of the waveguides and the means for coupling them together may be matched at an initial temperature, but often the optical properties vary as the ambient temperature changes. Thus, as the temperature changes these and other types of coupling may exhibit uneven optical properties over a range of temperatures. Accordingly, an optical assembly that allows for optical coupling with consistent optical properties over a range of temperatures and that is relatively inexpensive would be desirable.

SUMMARY

In one aspect, embodiments of an optical adhesive are provided. The optical adhesive includes 20% to 60% by volume of first monomers. Each of the first monomers has at least two acrylate or methacrylate groups. The optical adhesive also includes 40% to 80% by volume of second monomers. Each of the second monomers has at least one fluorine atom and at least one acrylate or methacrylate group. The optical adhesive has a refractive index of from about 1.40 to about 1.55, and in the temperature range of about 10° C. to about 85° C., the refractive index of the optical adhesive has a thermal drift dn/dT of less than the absolute magnitude of $|4\times10^{-4}/° C.|$ and the sign of that value is negative.

In one aspect, embodiments of an optical assembly are provided. The optical assembly may include a first waveguide, a second waveguide, and an adhesive for transmitting optical signals between the first waveguide and the second waveguide. The adhesive includes 20% to 60% by volume of first monomers, each of the first monomers comprising at least two acrylate or methacrylate groups. The adhesive also includes 40% to 800 by volume of second monomers, each of the second monomers comprising at least one fluorine atom and at least one acrylate or methacrylate group. The optical adhesive, upon curing, has a refractive index of from about 1.40 to about 1.55 at a wavelength of 1310 nm and at 25° C. In the temperature range of about 10° C. to about 85° C., the refractive index of the cured optical adhesive has a thermal drift dn/dT of less than about $-4\times10^{-4}/° C.$ In another aspect, an optical assembly includes a first optical waveguide, a second optical waveguide, and an optical adhesive forming a mechanical joint between the first optical waveguide and the second optical waveguide for transmitting optical signals between the first waveguide and the second waveguide. The optical adhesive includes a cured mixture of: 20% to 60% by volume of first monomers, each of the first monomers comprising at least two acrylate or methacrylate groups; and 40% to 80% by volume of second monomers, each of the second monomers comprising at least one fluorine atom and at least one acrylate or methacrylate group. The return loss across the mechanical joint is less than −40 dB as measured at a wavelength of 1310 nm.

In yet another aspect, a method of joining two optical waveguides is disclosed. The method includes inserting a liquid optical adhesive between a first optical waveguide and a second optical waveguide, wherein the optical adhesive comprises about 20% to about 60% by volume of first monomers and about 40% to about 80% by volume of second monomers, each of the first monomers comprising at least two acrylate or methacrylate groups, and each of the second monomers comprising at least one fluorine atom and at least one acrylate or methacrylate group. The method also includes exposing the liquid optical adhesive to ultraviolet light, thereby causing the liquid optical adhesive to cure into a solid optical adhesive configured for transmitting optical signals between the first optical waveguide and the second optical waveguide.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings, which are incorporated in and form a part of the specification, illustrate several aspects of the present disclosure and, together with the description, serve to explain the principles of the disclosure. In the drawings:

FIG. 5A is a side elevation view of an optical assembly including an optical fiber, a photonic waveguide, and an adhesive for transmitting optical signals between the optical fiber and the photonic waveguide according to an exemplary embodiment;

FIG. 5B is a top view of the photonic waveguide of FIG. 6A;

FIG. 9A is a side elevation view of an optical assembly including a first optical fiber, a second optical fiber, and an optical adhesive for transmitting optical signals between the first optical fiber and the second optical fiber by evanescent signal transmission according to an exemplary embodiment;

FIG. 9B is a cross-sectional side view of the optical assembly of FIG. 9A.

FIG. 10A is a side elevation view of an optical assembly including an optical fiber, a photonic waveguide, and an optical adhesive for transmitting optical signals between the optical fiber and the photonic waveguide by evanescent signal transmission according to an exemplary embodiment;

FIG. 10B is a cross-sectional view of the optical assembly of FIG. 10A.

FIG. 10C is a cross-sectional view of the optical waveguide of FIG. 10A.

FIG. 12A is a side elevation view of an optical assembly including an optical fiber, a cantilever waveguide with an integrated evanescent coupling to a photonic waveguide, and an optical adhesive for transmitting optical signals between the optical fiber, the cantilever waveguide and the photonic waveguide according to an exemplary embodiment;

FIG. 12B is a top view of the cantilever waveguide with an integrated evanescent coupling to a photonic waveguide of FIG. 12A.

FIG. 13A is a side elevation view of an optical assembly including an optical fiber, a cantilever waveguide, a photonic waveguide, and an optical adhesive for transmitting optical signals between the optical fiber, the cantilever waveguide, and the photonic waveguide according to an exemplary embodiment;

FIG. 13B is a top view of the photonic waveguide of FIG. 13A; and

While the following embodiments will be described in connection with certain preferred embodiments, there is no intent to limit this disclosure to the described embodiments. On the contrary, the intent is to cover all alternatives, modifications, and equivalents as included within the spirit and scope of the disclosure and as defined by the appended claims.

DETAILED DESCRIPTION

Referring generally to the figures, embodiments of an optical assembly are disclosed herein. The optical assembly includes an optical adhesive that has particularly suitability for joining optical waveguides, such as optical fibers or photonic waveguides, in a mechanical joint, especially where other joining techniques, such as fusion splicing, are not economically or practically feasible. Advantageously, the optical adhesive of the optical assembly exhibits low thermal drift. That is, the refractive index of the optical adhesive changes minimally with temperature. In embodiments, the change in refractive index of the optical adhesive, referred to herein as dn/dT, over the temperature range of from 10° C. to 85° C. is less than about $4 \times 10^{-4}$/° C. In embodiments, the optical adhesive is a curable product of at least two monomers. A first monomer includes at least two acrylate or methacrylate functional groups, i.e., the first monomer is a diacrylate or a dimetacrylate. The first monomer provides stiffness to limit the thermal drift of the refractive index (low dn/dT). The second monomer is selected to match the refractive index to that of the optical waveguides to be joined. In embodiments, the second monomer includes one or more fluorine-containing functional groups. Additionally, in embodiments, the optical adhesive includes silica ($SiO_2$) nanoparticles dispersed within the optical adhesive to strengthen internal bonding which helps reduce thermal drift. While the optical adhesive is described in terms of its usage with optical waveguides, the optical adhesive may be suitable for use in other applications and contexts, such as lighting, displays, backplanes, laminates for cell phones, lenses, and index matching to glasses for laminates, among others.

Figure 1:
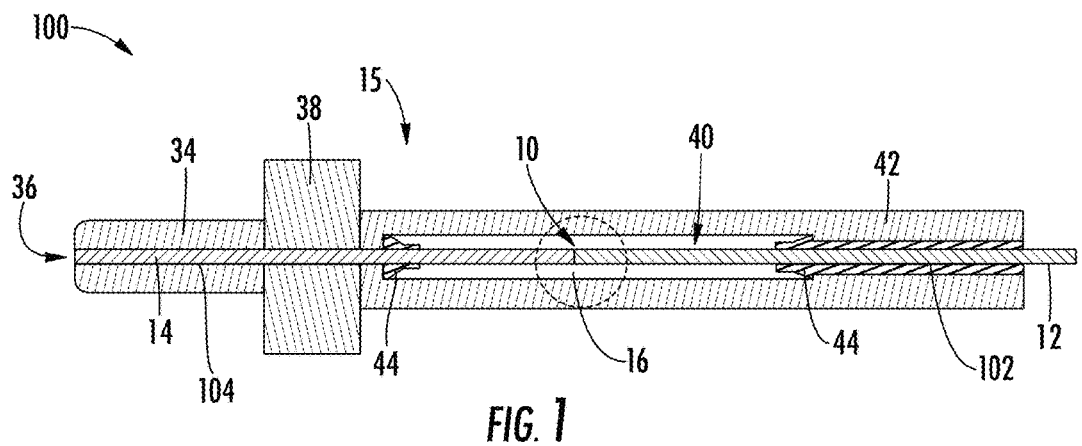
FIG. 1 is a perspective view of an optical fiber connector having a mechanical joint between an optical fiber and a fiber stub, according to an exemplary embodiment.
Figure 2:
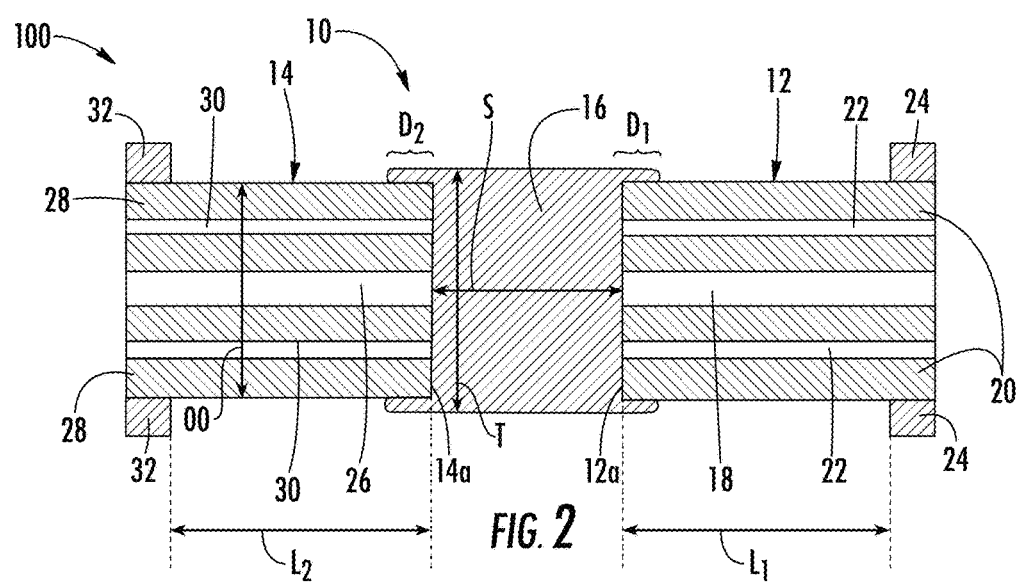
FIG. 2 depicts a detail view of a mechanical joint, according to an exemplary embodiment.

An optical assembly according to the present disclosure may include a first optical waveguide 102, a second optical waveguide 104, and an optical adhesive 16 for transmitting optical signals between the first waveguide 102 and the second waveguide 104 and for coupling the first waveguide 102 to the second waveguide 104. For example, FIGS. 1 and 2 depict an embodiment of an optical assembly 100 in which the first waveguide 102 is an optical fiber 12, the second waveguide 104 is a second optical fiber 14, and the optical adhesive 16 transmits optical signals between the first optical fiber 12 and the second optical fiber 14. While the waveguides 102, 104 of the optical assembly 100 are embodied as optical fibers 12, 14 in FIG. 1, the waveguides 102, 104 may be any suitable light transmission elements, including, for example, other types of optical fibers (e.g., D-shaped optical fibers and optical fibers with a diffraction grating) and photonic waveguides, as described in more detail below with reference to FIGS. 5A-13B. In the embodiment of FIG. 1, the optical adhesive 16 forms a mechanical joint 10 between two optical fibers 12, 14. In particular, the mechanical joint 10 is between end faces 12a, 14a of the first and second optical fibers 12, 14 of the optical assembly 100. In the embodiment of FIG. 1, the optical assembly 100 is part of an optical connector 15. However, in other embodiments the optical assembly 100 may form part of other optical systems, such as a photonic integrated circuit.

As discussed in more detail below, the optical adhesive 16 may include 20% to 60% by volume of first monomers, each of the first monomers comprising at least two acrylate or methacrylate groups; and 40% to 80% by volume of second monomers, each of the second monomers comprising at least one fluorine atom and at least one acrylate or methacrylate group. In addition, upon curing, the cured optical adhesive 16 may have a refractive index of from about 1.40 to about 1.55 at a wavelength of 1310 nm and at 25° C. Also, in the temperature range of about 10° C. to about 85° C., the refractive index of the cured optical adhesive 16 may have a thermal drift dn/dT of less than the absolute magnitude of $|4 \times 10^{-4}/° C.|$ and the sign of that value is negative. In some embodiments, a return loss across the mechanical joint 10 is less than −40 dB as measured at a wavelength of 1310 nm.

FIG. 2 provides a detailed view of the mechanical joint 10 of the optical assembly 100 of FIG. 1. As can be seen, the first optical fiber 12 is joined to the second optical fiber 14 using the optical adhesive 16. The first and second optical fibers 12 may be any suitable length. For example, in the embodiment of FIG. 2 the first optical fiber may extends through a cable (not shown) while the second optical fiber may be a short length fiber stub. The optical fiber 12 includes a core region 18 that is surrounded along its length by a cladding 20. The core region 18 carries optical signals transmitted from an electromagnetic radiation source. In embodiments, the optical signals include electromagnetic radiation having a wavelength from about 200 nm to about 2000 nm. The cladding 20 substantially contains the electromagnetic radiation within the core region 18 by reflecting the optical signals at the interface between the core region 18 and the cladding 20. Within the cladding 20, airlines 22 or other structures may be provided to enhance the flexibility of the optical fiber 12. The optical fiber 12 includes a fiber jacket 24 that surrounds cladding 14 along at least a portion of the length of the optical fiber 12. In embodiments, the fiber jacket 24 may be partially stripped from the cladding 20 to expose a first length $L_1$ of the core region 18 and the cladding 20 to facilitate bonding of the optical fiber 12 to the fiber stub 14.

Similarly, the second optical fiber 14 (also called fiber stub 14) includes a core region 26 that is surrounded along at least a portion of its length by a cladding 28. While a fiber stub 14 is illustrated in FIGS. 1 and 2, the optical assembly may include any length and type of optical fiber. The core region 26 carries optical signals, which are kept in the core region 26 by the cladding 28. The cladding 28 may include airlines 30 or other structures to enhance the flexibility of the optical fiber 12. As with optical fiber 12, the fiber stub 14 includes a fiber jacket 32 that may be partially stripped from the cladding 14 to expose a second length $L_2$ of core region 26 and the cladding 28 to facilitate bonding of the fiber stub 14 to the optical fiber 12.

The first optical fiber 12 has a first end face 12a that is aligned with a second end face 14a of the second optical fiber 14. In some embodiments, at least part of the optical adhesive 16 is located between the first end face 12a and the second end face 14a. The first and second end faces 12a, 14a are substantially coaxial and are separated by a space S. While the space S is depicted as being a constant space between the fibers, the space S between the end faces 12a, 14a may vary, including being zero (i.e., the end faces 12a, 14a touch in regions), depending, e.g., on the geometry of the end faces 12a, 14a after cleaving. In embodiments, the space S between end faces 12a, 14a is no more than about 900 nm. The optical adhesive 16 (FIG. 2) fills the space S between the end face 12a of the first optical fiber 12 and the end face 14a of the second optical fiber 14. Further, the optical adhesive 16 may extend over a portion of the exposed region $L_1$ of the first optical fiber 12 for a first distance $D_1$ and over the exposed region $L_2$ of the second optical fiber 14 for a second distance $D_2$. In some embodiments, the distances $D_1$ and $D_2$ are the same, and in other embodiments the distances $D_1$ and $D_2$ are different with D! being greater than $D_2$ or with $D_2$ being greater than $D_1$. In some embodiments, the distances $D_1$ and $D_2$ are from about 500 μm to about 1500 μm. Further, in some embodiments the first optical fiber 12 and the second optical fiber 14 (also called fiber stub 14) each have an outer cladding diameter OD of from about 10 μm to about 800 μm. In some embodiments, the optical adhesive 16 has a thickness T that is greater than the outer cladding diameter OD. In further embodiments, the thickness T of the optical adhesive 16 is at least 1.01*OD, and in some embodiments, the thickness T of the optical adhesive 16 is up to 1.50*OD). In embodiments in which the OD of the first optical fiber 12 is different than the OD of the second optical fiber 14, the optical adhesive has a thickness of from about 1.01 to about 1.50 times the larger of the OD of the first optical fiber 12 (also called a first outer diameter) and the OD of the second optical fiber 14 (also called the second outer diameter).

Returning to FIG. 1, it can be seen that the mechanical joint 10 of the optical assembly 100 is contained within a connector 15. As noted above, the optical assembly 100 may form part of other optical devices in addition to connectors. The connector 15 may include a ferrule 34 into which the fiber stub 14 is inserted. The ferrule 34 has a polished end 36 designed to form an optical connection with a receptacle (not pictured). In embodiments, the connector 15 is provided with a flange 38 downstream of the polished end 36, which may provide an abutment structure used in making an optical connection with a receptacle. In certain applications, a connector 15 may be provided with a fiber stub 14 and pre-polished in the factory after fabrication. In such an instance, the fiber stub 14 is connected with an optical fiber 12 in the field. In some applications, the connection between the fiber stub 14 and the optical fiber 12 is a fusion splice in which the ends of the fiber stub 14 and optical fiber 12 are fused together using heat. However, while fusion splices typically provide the best quality joint in terms of signal loss, fusion splicing equipment is expensive and may, in some circumstances, be difficult to use or unavailable in the field. According to the present disclosure, the optical adhesive 16 may be used to join the optical fiber 12 and fiber stub 14 in a manner that is more economical and easier to perform in the field. Further, as compared to other mechanical joining methods, the optical adhesive 16 as disclosed herein exhibits lower signal loss across the mechanical joint 10 as well as less thermal drift of the refractive index.

When joining the optical fiber 12 and fiber stub 14, the end faces 12a, 14a of each are inserted into a channel 40 of a connector body 42. The connector body 42 includes alignment features 44 that help bring the end faces 12a, 14a of the optical fiber 12 and the fiber stub 14 into coaxial alignment. In other embodiments for different optical assemblies, the end faces 12a, 14a of the optical fiber 12 and the fiber stub 14 may be aligned using other features within an optical assembly. The optical adhesive 16 is introduced into the channel 40 in liquid form and cured to a solid mechanical joint 10 using, for example, one or more of thermal energy, ultraviolet light, or pressure. In some embodiments, the formation of the mechanical joint 10 is facilitated with a double-ended optical fiber ferrule having a slit formed therein. The optical fiber 12 and fiber stub 14 are inserted into the double-ended ferrule, and the optical adhesive 16 is deposited around the optical fibers 12, 14 and between the end faces 12a, 14a through the slit. Thereafter, ultraviolet light is shone through the slit to cure the optical adhesive 16.

As noted above, the foregoing description is illustrative of an optical assembly that includes a first waveguide, a second waveguide, and an adhesive for transmission of optical signals between the first waveguide and the second waveguide and for coupling the first waveguide to the second waveguide to form a mechanical joint. Other example embodiments of optical assemblies will be described herein. However, first the optical adhesive 16 will be described in more detail. While the optical adhesive 16 is described with reference to the optical assembly 100 of FIGS. 1 and 2, the characteristics of the optical adhesive 16 apply to other optical assemblies, such as the optical assemblies described with reference to FIGS. 5A-13B.

Because the optical adhesive 16 is used to join optical waveguides 102, 104, the optical adhesive 16 must allow for the transfer of optical signal between the optical waveguides 102, 104 without significant signal loss. Thus, the optical adhesive 16 is made to have a refractive index that is close to or within an acceptable range of the refractive indexes of the optical waveguides 102, 104. For example, referring again to FIGS. 1 and 2, the optical adhesive 16 has a refractive index that is within +/−5% of a target refractive index value. As used here, the term target refractive index value is a refractive index value equal to the refractive index of the first optical waveguide 102, equal to the refractive index of the second optical waveguide 104, or between the refractive indexes of the first optical waveguide 102 and the second optical waveguide 104 at a wavelength of 1310 nm when measured at 25° C. As used herein, the refractive index of a waveguide means the effective index of the fundamental optical mode within the single mode waveguide.

As an example, in the embodiment illustrated in FIGS. 1 and 2, where the first optical waveguide 102 is the first optical fiber 12 and the second optical waveguide 104 is the second optical fiber 14, the target refractive index value is a refractive index value equal to the refractive index of the first optical fiber 12, equal to the refractive index of the second optical fiber 14, or between the refractive indexes of the first and second optical fibers 12, 14 at a wavelength of 1310 nm when measured at 25° C. In other embodiments, the optical adhesive 16 has a refractive index within +/−3% of the target refractive index value. In still other embodiments, the optical adhesive 16 is made to have a refractive index within +/−2% of the target refractive index value. In still other embodiments, the optical adhesive 16 is made to have a refractive index within +/−1% of the target refractive index value.

As noted above, the optical adhesive 16 may include 20% to 60% by volume of first monomers, each of the first monomers comprising at least two acrylate or methacrylate groups; and 40% to 80% by volume of second monomers, each of the second monomers comprising at least one fluorine atom and at least one acrylate or methacrylate group. In some embodiments, the optical fibers 12, 14 have a first refractive index, the first monomers have a second refractive index that is higher than the first refractive index, and the second monomers have a third refractive index that is lower than the first refractive index. Thus, when combined, the liquid optical adhesive 16 has a fourth refractive index that is less than the first refractive index. After exposing the liquid optical adhesive 16 to ultraviolet light, thereby causing the liquid optical adhesive 16 to cure into a solid optical adhesive 16, the solid optical adhesive 16 has a fifth refractive index that is within +/−10% of the first refractive index of the optical fibers 12, 14. In some embodiments, during the exposing step, the fourth refractive index rises from about 0.01 to about 0.05 to the fifth refractive index.

The optical adhesive 16 is made to have low thermal drift of its refractive index at typical usage temperatures, e.g., between the temperatures of about 10° C. to about 85° C. Changes in temperature cause most materials to expand (when heated) or contract (when cooled). As a material expands or contracts, its volume generally increases or decreases, respectively, and the density of a material is inversely proportional to the volume of the material (density=mass/volume). Typically, a denser material has a higher refractive index than a less dense material. Thus, as a material is heated, the increase in volume and accompanying decrease in density will typically result in a decrease in the refractive index of the material. Similarly, when a material is cooled, the decrease in volume and accompanying increase in density will typically result in an increase in the refractive index of the material. Further, because the waveguides are a different material than the adhesive used to join them, the refractive indexes may not change at the same rate when heated or cooled. Thus, as mentioned above, the change in refractive index with temperature can have a negative impact in optical communication where two waveguides are joined with a material that does not match the thermal drift of the two waveguides. Accordingly, as temperatures deviate from standard (e.g., 25° C.) where the materials are typically index matched, the optical transmission properties of certain conventional materials used to form mechanical joints are negatively impacted. Indeed, in some instances, the conventional mechanical joint materials experienced a change in return loss of more than 10 dB, and in some instances more than 20 dB, in the range of 10° C. to 85° C. That is, much more of the transmitted optical signal is reflected as the temperature deviates farther and farther from standard temperature.

According to the present disclosure, though, the optical adhesive 16 does not experience the same large changes in return loss as conventional materials at least in part because the optical adhesive 16 has low thermal drift of the refractive index (i.e., low dn/dT). The composition of the optical adhesive 16 that allows for these properties includes at least one first monomer having two acrylate or methacrylate functional groups and at least one second monomer having at least one fluorine atom and at least one acrylate or methacrylate group. In embodiments, the optical adhesive 16 includes from about 20% to about 60% by volume of the first monomers and from about 40% to about 80% by volume of the second monomers. Additionally, in embodiments, the optical adhesive 16 may include from about 1% to about 30% by weight of a nanoparticle, such as silica. Further, in embodiments, the nanoparticle is a polymerizable nanoparticle. Further, in embodiments, the optical adhesive 16 includes from about 0.5% to about 5% by volume of a silane acrylate or methacrylate. As will be discussed more fully below, in the optical adhesive 16, the first monomers provide stiffening of the optical adhesive 16 to mitigate the thermal drift in refractive index while the second monomers allow for tuning of the refractive index to wavelengths low enough to be matching for optical waveguides 102, 104, such as optical fibers 12, 14.

In greater detail, the first monomers include at least two acrylate or methacrylate groups and thus may be referred to as a diacrylate or dimethacrylate. In embodiments, the first monomer may contain more than two acrylate or methacrylate groups, such as a triacrylate. Such first monomers will extensively crosslink during polymerization, which will then yield a structure that resists thermal expansion. In embodiments, the first monomers may also contain one or more fluorine atoms to provide further tunability of the refractive index. Exemplary first monomers include 1,4-butanediol diacrylate, 1,4-butanediol dimethacrylate, 1,3-butanediol diacrylate, 2,2,3,3-tetrafluoro-1,4-butanediol diacrylate, and 2,2,3,3-tetrafluoro-1,4-butanediol dimethacrylate. The second monomers include at least one fluorine atom and at least one acrylate or methacrylate group and thus may be referred to as a monoacrylate or monomethacrylate. In embodiments, each second monomer contains from 1 fluorine atom to 23 fluorine atoms. Exemplary second monomers include 1,1,1,3,3,3-hexafluoroisopropyl methacrylate, 2,2,2-trifluoroethyl methacrylate, 2,2,3,3,4,4,5,5-octafluoropentyl methacrylate, and 2,2,3,3-tetrafluoropropyl methacrylate.

Table 1 provides an exemplary list of first monomers and second monomers along with their refractive indexes as measured at 25° C. As can be seen from Table 1, the first monomers all have higher refractive indexes than the second monomers. As such, the combination of first and second monomers will have a refractive index between the bounds of the refractive indexes of the first and second monomers. The monomers provided in Table 1 are provided for illustrative purposes only. Other monomers having the characteristics described above may also be used for the first monomers or second monomers depending on the final refractive index desired.

TABLE 1

List of First and Second Monomers for Optical Adhesive

| FIRST MONOMERS | Refractive index at 25° C. |
|---|---|
| 1,4-butanediol diacrylate | 1.45465 |
| 1,4-butanediol dimethacrylate | 1.45576 |
| 1,3-butanediol diacrylate | 1.44910 |
| 2,2,3,3-tetrafluoro-1,4-butanediol diacrylate | 1.41754 |
| 2,2,3,3-tetrafluoro-1,4-butanediol dimethacrylate | 1.41835 |
| SECOND MONOMERS | Refractive Index at 25° C. |
| 1,1,1,3,3,3-hexafluoroisopropyl methacrylate | 1.32892 |
| 2,2,2-trifluoroethyl methacrylate | 1.35932 |
| 2,2,3,3,4,4,5,5-octafluoropentyl methacrylate | 1.35569 |
| 2,2,3,3-tetrafluoropropyl methacrylate | 1.37779 |

In embodiments, the optical adhesive 16 includes first and second monomers in a proportion that achieves a final refractive index of from about 1.36 to about 1.50 as measured with a wavelength of 1550 mm at 25° C. In a particular embodiment, the optical adhesive 16 is selected to have a refractive index of about 1.43 as measured with a wavelength of 1550 nm at 25° C.

As mentioned above, in embodiments, the optical adhesive 16 may also include nanoparticles. In particular embodiments, the nanoparticles are polymerizable. Polymerizable nanoparticles are nanoparticles coated with functional groups, such as acrylate, methacrylate, or vinyl groups. In embodiments, the nanoparticles are sized such that, on average, a longest cross-sectional dimension of such nanoparticles is from about 5 nm to about 50 nm, from about 5 nm to about 45 nm, from about 5 nm to about 40 nm, from about 5 nm to about 35 nm, from about 5 nm to about 30 nm, from about 5 nm to about 25 nm, from about 5 nm to about 20 nm, from about 5 nm to about 15 nm, or from about 5 nm to about 10 nm. In embodiments, the nanoparticles comprise a material having a refractive index matching or less than the refractive index of the material of the core region 18, 26 of the optical fibers 12, 14 (as shown in FIG. 2) or the waveguide of a photonic waveguide in embodiments such as those described below. In an embodiment, an exemplary nanoparticle material is silica. A particularly suitable polymerizable silica nanoparticular for use in the optical adhesive is acrylate coated nanosilica particles available from Nissan Chemical Corporation (commercially known as ORGANOSILICASOL™, in particular product designation MEK-AC-2202). In a particular embodiment, the nanoparticles are silica nanoparticles and have an average cross-sectional dimension of 20 nm. Advantageously, such silica nanoparticles enhance rigidity of the cured optical adhesive without inducing scattering effects for the long telecom wavelengths of 1310 nm and 1550 nm.

In embodiments, the optical adhesive 16 includes an adhesion promoter to help bond the first waveguide 102 to the second waveguide 104. Exemplary adhesion promoters include organic titanates and zironates (e.g., Tyzor® available from Dorf-Ketal Chemicals India Private Limited, Maharashtra, India) and 3-(trimethoxysilyl) propyl methacrylate. In embodiments, the adhesion promoter or promoters are applied to the bonding regions of the optical waveguides (e.g., first and second optical fibers 12, 14) to be joined prior to applying the optical adhesive.

In embodiments, the optical adhesive 16 includes anti-oxygen inhibition additives. Such anti-oxygen inhibition additives inhibit oxygen from limiting the UV curing of the polymer during atmospheric polymerization. Exemplary anti-oxygen inhibition additives usable in the optical adhesive 16 are broadly classified as hydrogen donors (e.g., amines, thiols, hydrogen phosphites, silanes, stannanes, benaldehydes, etc.), N-vinyl amides reducing agents (e.g., aromatic phosphines, aliphatic phosphines, phosphites, sulphites, etc.), sensitizers (e.g., isopropyl thioxantone), $CO_2$ producers (e.g., N-phenylglycine and its derivatives, phenylthioacetic acid, O-benzoyloxime benzaldehyde, 1-phenyl-1,2-propanedione2-(O-ethoxycarboxy)oxime), and $O_2$ scavengers (e.g., trieithyl amine, (2,4,6-trimethylbenzoyl) diphenylphosphine oxide ["TPO"], 2, 5-diphenyl furan, 9,10-dibutyl anthracene, etc.). In particular, triphenyl phosphine (PPh), an N-vinyl amide reducing agent, is believed to be a potent additive for mitigation of oxygen inhibition of polymerization. Advantageously, the anti-oxygen inhibition additives are effective at improving the curing efficiency for low energy LED light curing systems, which may be suitable for field curing of the optical adhesive 16 disclosed herein.

In order to cure the optical adhesive 16, a photonitiator may be included. In embodiments, the optical adhesive 16 includes from about 0.5% to about 10% by volume of a photoinitator. Suitable photoinitators include bis(2,4,6-trimethylbenzoyl)-phenylphosphineoxide (e.g., IRGACURE® 819, available from Ciba Specialty Chemicals, Inc.), 2-Hydroxy-2-methyl-1-phenyl-propan-1-one (e.g., DAROCUR® 1173, available from Ciba Specialty Chemicals, Inc.), and benzophenone, among others. Such photoinitiators cure when subject to ultraviolet light having a wavelength of from about 300 nm to about 500 nm. Alternatively, one could add in a thermal initiator or even a combination of photoinitiator and thermal iniator to the optical adhesive 16. A commercial example of a thermal iniator are Azo group (R—N=N—R') based agents such as Vazo 64, also known as AIBN (Azobisisobutyronitrile).

In formulating the optical adhesive 16, it is noted that the refractive index will increase from the liquid form to the solid form after curing. Accordingly, the first and second monomers are selected and proportioned with this in mind. In preparing a formulation for the optical adhesive 16, the liquid refractive index will be between the refractive indexes of the first monomer and the second monomer. Further, other additives, such as the photoinitators, nanoparticles, adhesion promotors, and anti-oxygen inhibition additives, will affect the refractive index of the liquid optical adhesive. Additionally, upon curing, the solid optical adhesive will have a refractive index of from about 0.01 to about 0.05 higher than the liquid refractive index on account of the crosslinking that occurs during curing. More typically, the solid optical adhesive 16 will have a refractive index of from about 0.03 to about 0.04 higher than the liquid refractive index. Table 2, below, provides the refractive index of various mixtures prior to curing. For the purpose of comparison, the final entry in the table for 100% 1,1,3,3,3-hexafluoroisopropyl methacrylate demonstrates that curing of a single component also causes an increase in refractive index from liquid to solid. The first entry of 1,4-butanediol dimethacrylate and 1,1,3,3,3-hexafluoroisopropyl methacrylate cured to a final refractive index of 1.4492, which was about 0.033 higher than the liquid refractive index.

TABLE 2

Refractive indices (n) for monomer mixtures

| Diacrylate or dimethacrylate monomer (A) | Fluorine-containing monomer (B) | A:B | n at 25° C. (before cure) |
|---|---|---|---|
| 1,4-butanediol dimethacrylate | 1,1,3,3,3-hexafluoroisoprpyl methacrylate | 1:1 | 1.41163 |
| 1,4-butanediol dimethacrylate | 2,2,3,3-tetrafluoro-1,4-butanediol diacrylate | 1:1 | 1.45031 |
| 1,4-butanediol dimethacrylate | 2,2,3,3-tetrafluoro-1,4-butanediol dimethacrylate | 1:1 | 1.45009 |
| Comparative Example 100% 1,1,3,3,3-hexafluoroisopropyl methacrylate | | | 1.31816 |

Figure 3:
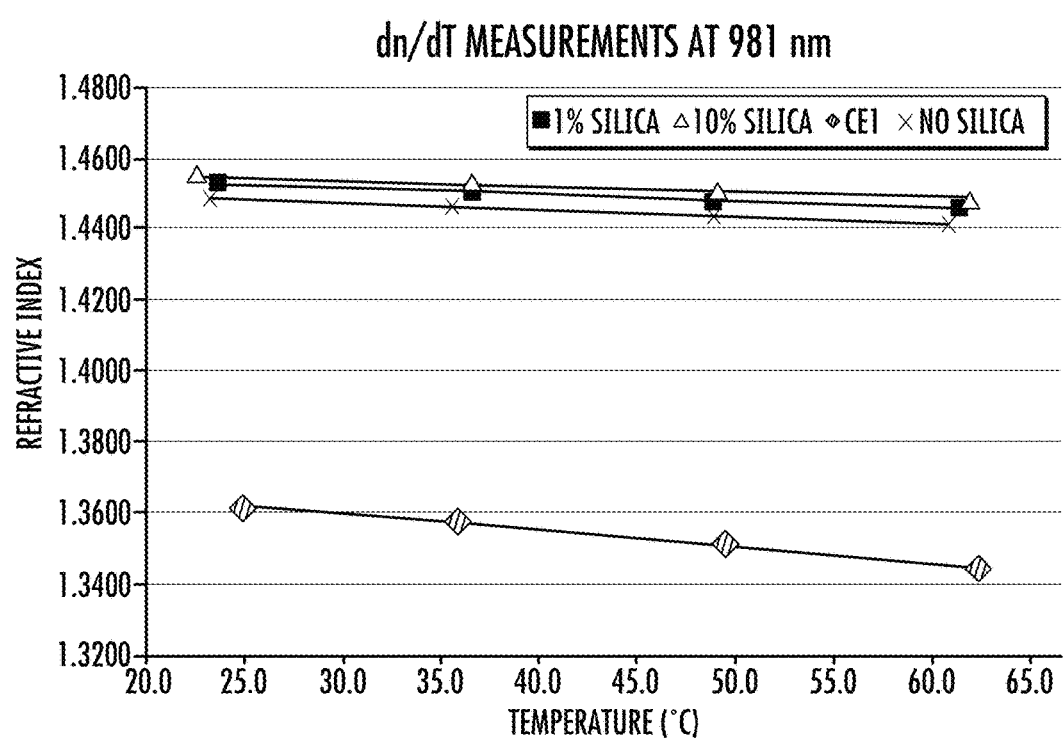
FIG. 3 depicts dn/dT measurements for three optical adhesives according to the present disclosure and one comparative example.

Table 3, below, provides exemplary compositions for the optical adhesive 16 as well as a comparative example. The three exemplary compositions comprise the first monomer of 1,4-butanediacrylate and the second monomer of 1,1,3,3,3-hexafluoroisopropyl methacrylate in a ratio of 1:1 by volume. To each of the exemplary compositions, a different amount of silica nanoparticles ("nanosilica") was added. Example 1 has no nanosilica; Example 2 has 1% by weight nanosilica; and Example 3 has 10% by weight nanosilica. The Comparative Example contains only 1,1,3,3,3-hexafluoroisopropyl methacrylate. In Table 3, each composition has a reported refractive index measured at 5° C. As can be seen, increasing the amount of nanosilica increases the refractive index. Further, each example has a thermal drift provided. The thermal drift was calculated by taking the slope of the lines plotted in FIG. 3. As can be seen in FIG. 3, the lines for Examples 1-3 are much less steep than the line for Comparative Example 1. FIG. 3 and Table 3 also demonstrate that the thermal drift decreasing with increasing amounts of nanosilica. All refractive index measurements shown in FIG. 3 were determined on a Metricon 2010 Prism Coupler using the single beam method according to ASTM C1648-12. High temperature measurements were made by heating the sample compartment with $N_2$ purge run through a copper coil immersed in a silicone oil bath heated by a temperature controlled circulator unit. Measurements of dn/dT were performed at 633 nm and 981 nm. The measures at 981 nm are shown in FIG. 3.

TABLE 3

Effect of Nanosilica on Refractive Index and Thermal Drift

| Optical adhesive | n at 5° C. | dn/dT |
|---|---|---|
| Comparative Example 1 | 1.3620 | $-4.51 \times 10^{-4}/°$ C. |
| Example 1 (no nanosilica) | 1.4492 | $-1.80 \times 10^{-4}/°$ C. |
| Example 2 (1% nanosilica) | 1.4603 | $-1.68 \times 10^{-4}/°$ C. |
| Example 3 (10% nanosilica) | 1.4551 | $-1.42 \times 10^{-4}/°$ C. |

With continued reference to Table 3 and FIG. 3, comparison of thermal profiles for the two monomer system of Examples 1-3 with the single monomer of Comparative Example 1 demonstrates improved dn/dT for the optical adhesive. Comparative Example 1, 1,1,3,3,3-hexafluoroisopropyl methacrylate has been used as a low refractive index optical adhesive. The slope of Comparative Example 1 between 25° C. and 62.3° C. is $-4.51 \times 10^{-4}/°$ C. When this monomer is combined at 50% by volume with 1,4-butanediacrylate (Example 1), the refractive index increases to about 1.449, and dn/dT also increases to $-1.80 \times 10^{-4}/°$ C. Taking the same 50%/50% mixture and adding 1% by weight of acrylate coated nanosilica (Example 2) provides a further increase in dn/dT of $-1.68 \times 10^{-4}/°$ C. When the acrylate-coated nanosilica is increased to 10% by weight, then dn/dT increases further to $-1.42 \times 10^{-4}/°$ C. Table 4, below, provides exact compositions for Examples 1-3. Darocur 1173 and benzophenone are used as photoinitators.

TABLE 4

Example Optical Adhesive Compositions

| | Example 1 | Example 2 | Example 3 |
|---|---|---|---|
| 1,1,3,3,3-hexafluoroisopropyl methacrylate | 1 ml | 1 ml | 1 ml |
| 1,4-butanediol diacrylate | 1 ml | 1 ml | 1 ml |
| 3-(trimethoxysilyl) propyl methacrylate | 68 µL | 68 µL | 68 µL |
| Nanosilica-acrylate | 0 | 22 mgs | 220 mgs |
| Darocur 1173 | 50 µL | 50 µL | 50 µL |
| Benzophenone | 150 mgs | 150 mgs | 150 mgs |

Figure 4:
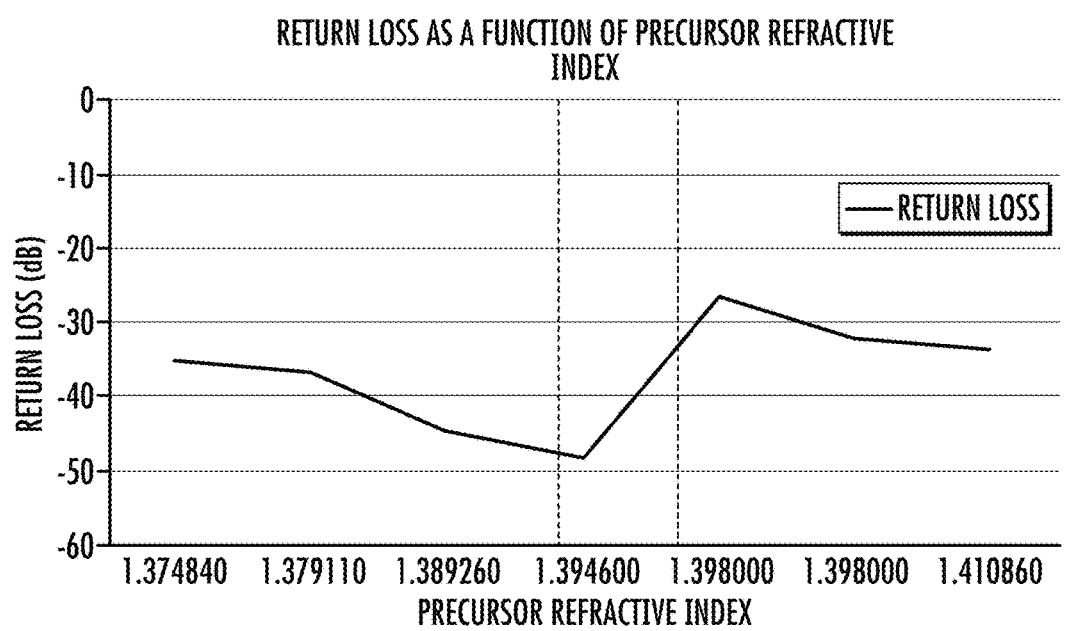
FIG. 4 depicts the return loss as a function of precursor refractive index for optical adhesives according to the present disclosure, according to an exemplary embodiment.

FIG. 4 depicts return loss against the liquid optical adhesive refractive index (i.e., before UV light cure). The return loss is measured for SMF-28 optical fiber (available from Corning Incorporated, Corning, N.Y.). As can be seen, the return loss for an optical adhesive 16 according to present disclosure is less than −40 dB. In embodiments, the return loss is less than −45 dB. From FIG. 4, it is estimated that the optimal precursor refractive index value before UV cure lies somewhere between about 1.39460 and about 1.39800. It should be noted that the refractive indexes given in FIG. 4 were measured at typical telecommunications wavelengths of 1310 nm to 1550 nm, and the refractive indexes of the materials used in the optical adhesive 16 were lower at these wavelengths than the refractive indexes reported in the other Tables and Figures, which were measured at 981 nm. Hence, the "optimal" precursor refractive index is for telecommunications applications, and the optimal precursor refractive index for other applications and/or as measured at a different wavelength may be different. The refractive index of the precursor optical adhesive liquid were measured before UV light polymerization on an ABBE Refractometer (Anton Paar, Abbemat 300 with temperature control accuracy ±0.0001 nD).

FIGS. 5A-13B illustrate additional embodiments of optical assemblies that utilize the optical adhesive 16 for transmitting optical signals between a first waveguide 102 and a second waveguide 104. The optical adhesive 16 used in the embodiments of FIGS. 5A-13B has the same characteristics as those described except where indicated.

Referring now to FIG. 5A, an optical assembly 44 is illustrated that includes a first waveguide 102 that is an optical fiber 46, a second waveguide 102 that is a photonic waveguide 48, and an optical adhesive 16 for transmitting optical signals between the optical fiber 46 and the photonic waveguide 48. At least part of the optical adhesive 16 is located between a first end face 60 of the optical fiber 46 and a second end face 62 of the photonic waveguide 48 for transmitting optical signals therebetween. FIG. 5B is a cross-sectional, top view of the photonic waveguide 48 of FIG. 5A.

The optical fiber 46 may be any suitable type of optical fiber and, in general, includes a core region 18 that is surrounded along its length by a cladding 20. The core region 18 carries optical signals transmitted from an electromagnetic radiation source (not shown). In embodiments, the optical signals include electromagnetic radiation having a wavelength from about 200 nm to about 2000 nm. The cladding 20 substantially contains the electromagnetic radiation within the core region 18 by reflecting the optical signals at the interface between the core region 18 and the cladding 20. Within the cladding 20, airlines (not shown) or other structures may be provided to enhance the flexibility of the optical fiber 46. The optical fiber 46 may also include other coverings, such as a jacket (not shown), to protect the optical fiber 46 along at least a portion of its length.

The photonic waveguide 48 is part of a multi-layer system 50 that may include a substrate 52, the photonic waveguide 48, one or more planarization layers 54, and an encapsulation 56. The multi-layer system 50 may include additional or fewer layers in other embodiments, and may form part of a photonic integrated circuit or other photonic device. FIG. 5B illustrates a cross-sectional top view of the photonic waveguide 48. The photonic waveguide 48 may have an inverse taper 58 near the second end face 62, or another variation of the photonic waveguide geometry that modifies the optical mode field to match it to the mode field of the optical fiber 46.

The optical fiber 12 has a first end face 60 that is aligned with the second end face 62 of the photonic waveguide 48. In some embodiments, at least part of the optical adhesive 16 is located between the first end face 60 and the second end face 62 to facilitate transmission of optical signals between the optical fiber 46 and the photonic waveguide 48. The first and second end faces 60, 62 are substantially aligned and are separated by a space S. While the space S is depicted as being a constant space, the space S between the end faces 60, 62 may vary, including being zero (i.e., the end faces 60, 62 touch in regions), depending, e.g., on the geometry of the end faces 60, 62. The optical adhesive 16 fills the space S between the end faces 60, 62 and may extend over other portions of the optical fiber 46 and the photonic waveguide 48, as illustrated in FIG. 5A.

During fabrication, the optical adhesive 16 is introduced into the space S between the optical fiber 46 and the photonic waveguide 48 in liquid form and cured to a solid mechanical joint 64 using, for example, one or more of thermal energy, ultraviolet light, or pressure. The curing may take place, for example, by way of ultraviolet light that is shone onto the optical adhesive 16.

In some embodiments, the optical adhesive 16 is made to have a refractive index that is within +/−5% of the target refractive index value. In the embodiment illustrated in FIG. 5A, the target refractive index value is a refractive index value equal to the refractive index of the optical fiber 46, a refractive index value equal to the refractive index of the photonic waveguide 48, or a refractive index value between the refractive indexes of the optical fiber 46 and the photonic waveguide 48 at a wavelength of 1310 nm when measured at 25° C. In other embodiments, the optical adhesive 16 has a refractive index within +/−3% of the target refractive index value. In still other embodiments, the optical adhesive 16 is made to have a refractive index within +/−2% of the target refractive index value. In still other embodiments, the optical adhesive 16 is made to have a refractive index within +/−1% of the target refractive index value.

As noted above, the optical adhesive may include 20% to 60% by volume of first monomers and 40% to 80% by volume of second monomers. In some embodiments, the optical fiber 46 and the photonic waveguide 48 have a first refractive index, the first monomers have a second refractive index that is higher than the first refractive index, and the second monomers have a third refractive index that is lower than the first refractive index. Thus, when combined, the liquid optical adhesive 16 has a fourth refractive index that is less than the first refractive index. After exposing the liquid optical adhesive 16 to ultraviolet light, thereby causing the liquid optical adhesive 16 to cure into a solid optical adhesive 16, the solid optical adhesive 16 has a fifth refractive index that is within +/−5% of the first refractive index of the optical fiber 46 and the photonic waveguide 48. In some embodiments, during the exposing step, the fourth refractive index rises from about 0.01 to about 0.05 to the fifth refractive index.

Figure 6:
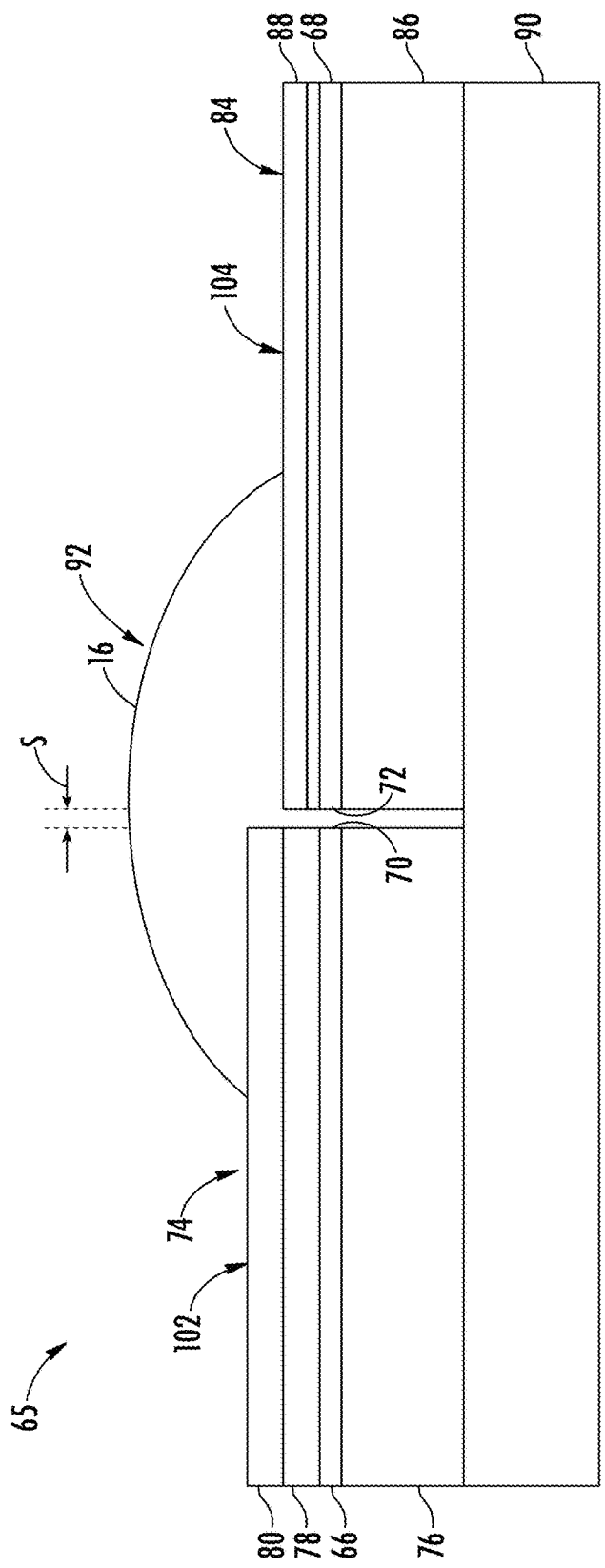
FIG. 6 is a side elevation view of an optical assembly including a first photonic waveguide, a second photonic waveguide, and an optical adhesive for transmitting optical signals between the first photonic waveguide and the second photonic waveguide according to an exemplary embodiment.

FIG. 6 is a side elevation view of another embodiment of an optical assembly 65 that includes a first waveguide 102 that is a first photonic waveguide 66, a second waveguide 104 that is a second photonic waveguide 68, and an optical adhesive 16 for transmitting signals between the first photonic waveguide 66 and the second photonic waveguide 68. The first photonic waveguide 66 has a first end face 70 that is aligned with a second end face 72 of the second photonic waveguide 68, and at least a portion of the adhesive 16 is located between the first end face 70 of the first photonic waveguide 66 and the second end face 72 of the second photonic waveguide 68 for transmitting optical signals therebetween.

The first photonic waveguide 66 is part of a first multi-layer system 74 that may include a substrate 76, the first photonic waveguide 66, one or more planarization layers 78, and an encapsulation layer 80. Likewise, the second photonic waveguide 68 is part of a second multi-layer system 84 that may include a substrate 86, the second photonic waveguide 68, and one or more planarization layers 88. Both multi-layer systems 74, 84 may include additional or fewer layers in other embodiments. Each multi-layer system 74, 84 may form part of a photonic integrated circuit system (not shown) or other photonic device. The optical assembly of FIG. 6 also includes a carrier substrate 90 on which the first and second multi-layer systems 74, 84 are located. In some embodiments, the carrier substrate 90 helps to align the first photonic waveguide 66 with the second photonic waveguide 68.

The first photonic waveguide 66 has a first end face 70 and the second photonic waveguide 68 has a second end face 72. The first end face 70 of the first photonic waveguide 66 is aligned with the second end face 72 of the second photonic waveguide 68. In some embodiments, at least part of the optical adhesive 16 is located between the first end face 70 and the second end face 72 to facilitate transmission of optical signals between the first photonic waveguide 66 and the second photonic waveguide 68. The first and second end faces 70, 72 are substantially aligned and are separated by a space S. While the space S is depicted as being a constant space between the first and second end faces 70, 72, the space S may vary, including being zero (i.e., the end faces 70, 72 touch in regions). The optical adhesive 16 fills the space S between the end faces 70, 72 and may extend over portions of the multi-layer systems 74, 84, as illustrated in FIG. 6.

During fabrication, the optical adhesive 16 is introduced into the space S between the multi-layer systems 74, 84 in liquid form and cured to a solid mechanical joint 92 using, for example, one or more of thermal energy, ultraviolet light, or pressure. The curing may take place, for example, by way of ultraviolet light that is shone onto the optical adhesive 16.

In some embodiments, the optical adhesive 16 is made to have a refractive index that is within +/−5% of the target refractive index value. In the embodiment illustrated in FIG. 6, the target refractive index value is a refractive index value that is equal to the refractive index of the first photonic waveguide 66, a refractive index value that is equal to the refractive index of the second photonic waveguide 68, or a refractive index value that is between the refractive indexes of the first and second photonic waveguides 66, 68 at a wavelength of 1310 nm when measured at 25° C. In other embodiments, the optical adhesive 16 has a refractive index within +/−3% of the target refractive index value, and in still other embodiments, the optical adhesive 16 is made to have a refractive index within +/−2% of the target refractive index value. In other embodiments, the optical adhesive 16 is made to have a refractive index within +/−1% of the target refractive index value.

The optical adhesive 16 may include first monomers and second monomers, and, in some embodiments, the first and second photonic waveguides 66, 68 have a first refractive index, the first monomers have a second refractive index that is higher than the first refractive index, and the second monomers have a third refractive index that is lower than the first refractive index. Thus, when combined, the liquid optical adhesive has a fourth refractive index that is less than the first refractive index. After exposing the liquid optical adhesive to ultraviolet light, thereby causing the liquid optical adhesive to cure into a solid optical adhesive, the solid optical adhesive has a fifth refractive index that is within +/−5% of the first refractive index of the photonic waveguides 66, 68. In some embodiments, during the exposing step, the fourth refractive index rises from about 0.01 to about 0.1 to the fifth refractive index.

The optical assembly illustrated in FIG. 6 may form part of a larger system, such as an photonic integrated circuit.

Figure 7A:
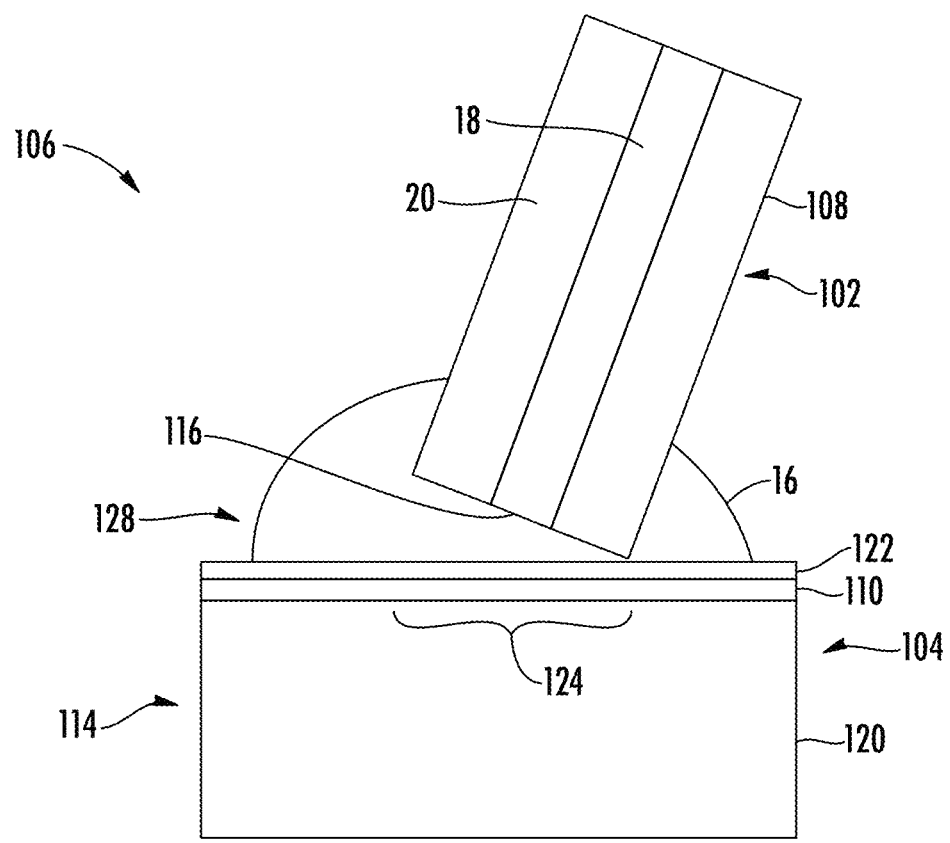
FIG. 7A is a side elevation view of an optical assembly including an optical fiber, a photonic waveguide that includes a grating, and an optical adhesive for transmitting optical signals between the optical fiber and the photonic waveguide via the grating according to an exemplary embodiment.
Figure 7B:
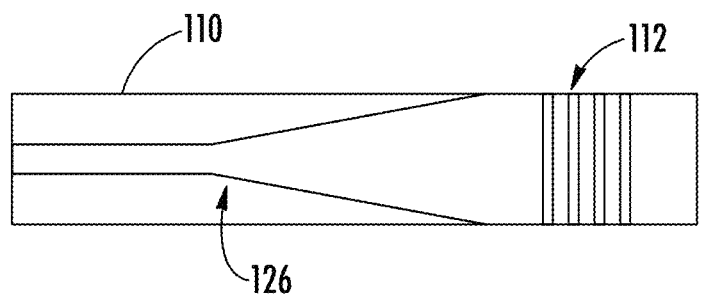
FIG. 7B is a cross-sectional top view of the photonic waveguide of FIG. 7A.

FIG. 7A is a side elevation view of an optical assembly 106 including a first optical waveguide 102 that is an optical fiber 108, a second optical waveguide 104 that is a photonic waveguide 110 that includes a diffraction grating 112, and an optical adhesive 16 for transmitting optical signals between the optical fiber 108 and the photonic waveguide 110 through the diffraction grating 112. The photonic waveguide 110 forms part of a multi-layer system 114. At least a portion of the adhesive 16 is located between a first end face 116 of the optical fiber 108 and a diffraction area 124 of the multi-layer system 114. FIG. 7B is a cross-sectional, top view of the photonic waveguide 110 showing the diffraction grating 112.

The optical fiber 12 of FIG. 7A is similar to the optical fiber of FIG. 5A, and includes a core region 18 that is surrounded along its length by a cladding 20. The multi-layer system 114 includes a substrate 120, the photonic waveguide 110, one or more planarization layers 122, and a diffraction area 124. The multi-layer system 114 may include additional layers or fewer elements in other embodiments. Referring specifically to FIG. 7B, the photonic waveguide 110 includes a taper 126 and a diffraction grating 112.

The optical fiber 108 has a first end face 116 that is aligned with the diffraction area 124 of the multi-layer system 114. In some embodiments, at least part of the optical adhesive 16 is located between the first end face 116 and the diffraction area 124 to facilitate transmission of optical signals between the optical fiber 108 and the photonic waveguide 110 via the diffraction grating 112. Further, the optical adhesive 16 may extend over portions of the optical fiber 108 and portions of the multi-layer system 114 outside of the diffraction area 124, as illustrated in FIG. 7A.

During fabrication, the optical adhesive 16 is introduced into the space S between the optical fiber 108 and the diffraction area 124 of the multi-layer system 114 in liquid form and cured to a solid mechanical joint 128 using, for example, one or more of thermal energy, ultraviolet light, or pressure. The curing may take place, for example, by way of ultraviolet light that is shone onto the optical adhesive 16.

In some embodiments, the optical adhesive 16 is made to have a refractive index that is within +/−5% of the target refractive index value. In the embodiment illustrated in FIG. 7A, the target refractive index value is equal to the refractive index of the optical fiber 108 or equal to the refractive index of the photonic waveguide 110, or between the refractive indexes of the optical fiber 108 and the photonic waveguide 110 at a wavelength of 1310 nm when measured at 25° C. In other embodiments, the optical adhesive 16 has a refractive index within +/−3% of the target refractive index value, and in still other embodiments, the optical adhesive 16 is made to have a refractive index within +/−2% of the target refractive index value. In still other embodiments, the optical adhesive 16 is made to have a refractive index within +/−1% of the target refractive index value.

As noted above, the optical adhesive 16 may include first monomers and second monomers. In some embodiments, the optical fiber 108 and the photonic waveguide 110 have a first refractive index, the first monomers have a second refractive index that is higher than the first refractive index, and the second monomers have a third refractive index that is lower than the first refractive index. Thus, when combined, the liquid optical adhesive 16 has a fourth refractive index that is less than the first refractive index. After exposing the liquid optical adhesive 16 to ultraviolet light, thereby causing the liquid optical adhesive 16 to cure into a solid optical adhesive 16, the solid optical adhesive 16 has a fifth refractive index that is within +/−5% of the first refractive index of the optical fiber 108 and the photonic waveguide 110. In some embodiments, during the exposing step, the fourth refractive index rises from about 0.01 to about 0.1 to the fifth refractive index.

The optical assembly illustrated in FIG. 7A may form part of a larger system, such as a photonic integrated circuit.

Figure 8:
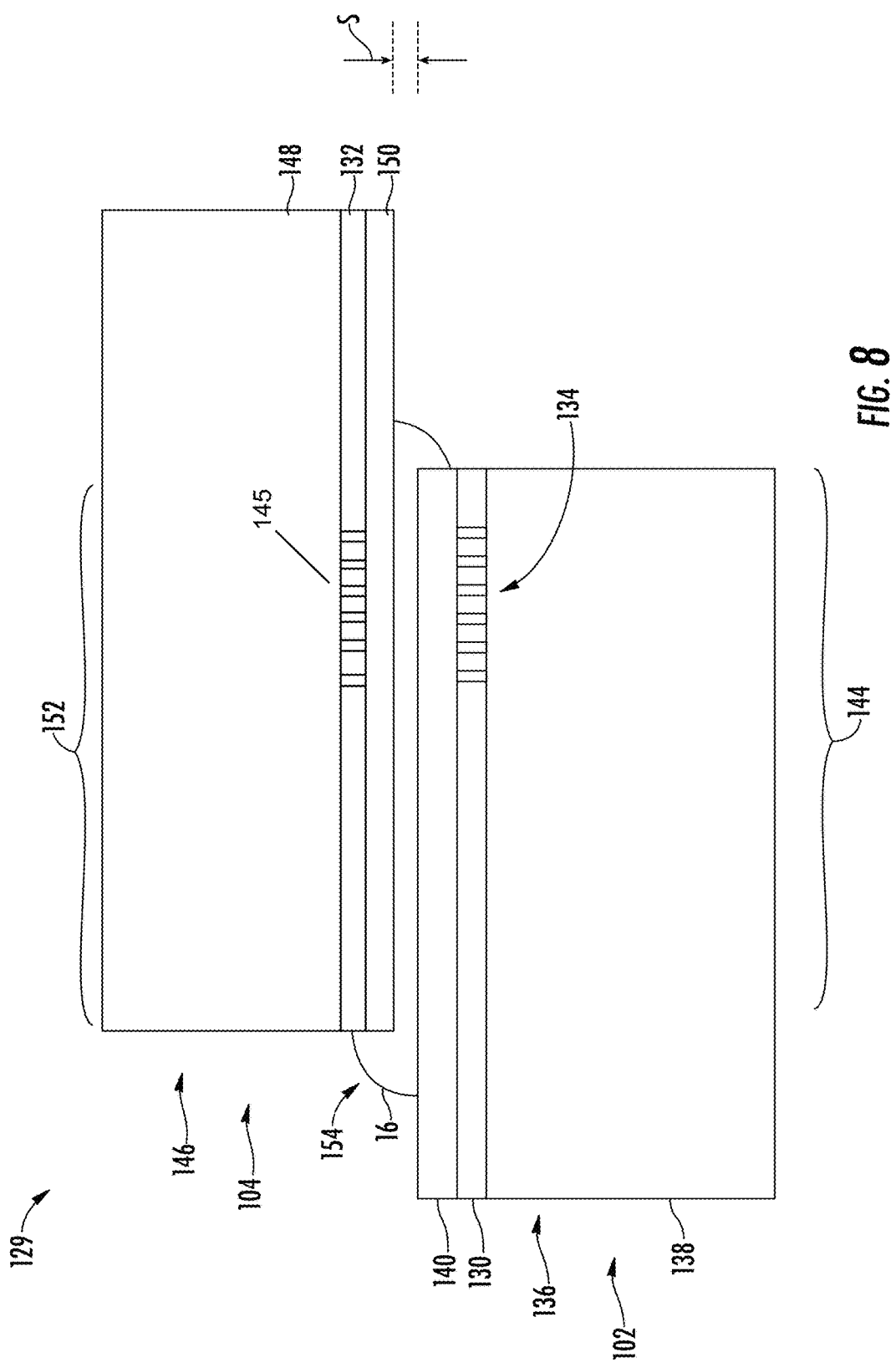
FIG. 8 is a side view of an optical assembly including a first photonic waveguide, a second photonic waveguide that includes a grating, and an optical adhesive for transmitting optical signals between the first photonic waveguide and the second photonic waveguide via the grating according to an exemplary embodiment.

FIG. 8 is a sideview of an optical assembly 129 including a first waveguide 102 that is a first photonic waveguide 130, a second waveguide 104 that is a second photonic waveguide 132, and an adhesive 16 for transmitting optical signals between the first photonic waveguide 130 and the second photonic waveguide 132. The first photonic waveguide 130 includes a diffraction area 134 that includes a diffraction grating and the optical adhesive 16 transmits optical signals between the first photonic waveguide 130 and the second photonic waveguide 132 through the diffraction grating area 134.

The first photonic waveguide 130 forms part of a first multi-layer system 136 that includes a substrate 138, the first photonic waveguide 130, and one or more planarization layers 140. The first photonic waveguide 130 includes a diffraction area 134 with a diffraction grating, which may be similar to the diffraction grating 112 shown in FIG. 7B.

The second photonic waveguide 132 forms part of a second multi-layer system 146 that includes a substrate 148, the second photonic waveguide 132, and one or more planarization layers 150. The second photonic waveguide 132 also includes a diffraction area 145. The first and second multi-layer systems 136, 146 may include additional or fewer layers in other embodiments.

The second multi-layer system 146 is inverted and located adjacent to the first multi-layer system 136 so that a first portion 144 of the first photonic waveguide 130 overlaps with a second portion 152 of the second photonic waveguide 132. The optical adhesive 16 is located between the first and second portions 144, 152 to allow for signal transmission between the first and second photonic waveguides 130, 132 and to secure the first multi-layer system 136 to the second multi-layer system 146. The first portion 144 of the first photonic waveguide 130 includes the diffraction area 134 and the second portion 152 of the second photonic waveguide 132 includes the diffraction area 145 so that optical signals transmit between the first photonic waveguide 130 and the second photonic waveguide 132 through the adhesive 16 and the diffraction areas 134, 145.

The first and second multi-layer systems 136, 146 may be separated by a space S. While the space S is depicted as being a constant space between the first and second multi-layer systems 136, 146, the space S may vary, including being zero (i.e., the multi-layer systems 136, 146 touch in regions). The optical adhesive 16 fills the space S and may extend over portions of the sides of the multi-layer systems 136, 146, as illustrated in FIG. 8.

During fabrication, the optical adhesive 16 is introduced into the space S between the multi-layer systems 136, 146 in liquid form and cured to a solid mechanical joint 154 using, for example, one or more of thermal energy, ultraviolet light, or pressure. The curing may take place, for example, by way of ultraviolet light that is shone onto the optical adhesive 16.

In some embodiments, the optical adhesive 16 is made to have a refractive index that is within +/−5% of the target refractive index value. In the embodiment illustrated in FIG. 8, the target refractive index value is equal to the refractive index of the first photonic waveguide 130, equal to the refractive index of the second photonic waveguide 132, or between the refractive indexes of the first and second waveguides 130, 132 at a wavelength of 1310 nm when measured at 25° C. In other embodiments, the optical adhesive 16 has a refractive index within +/−3% of the target refractive index value. In still other embodiments, the optical adhesive 16 is made to have a refractive index within +/−2% of the target refractive index value. In still other embodiments, the optical adhesive 16 is made to have a refractive index within +/−1% of the target refractive index value.

As noted above, the optical adhesive 16 may include first monomers and second monomers. In some embodiments, the first and second photonic waveguides 130, 132 have a first refractive index, the first monomers have a second refractive index that is higher than the first refractive index, and the second monomers have a third refractive index that is lower than the first refractive index. Thus, when combined, the liquid optical adhesive 16 has a fourth refractive index that is less than the first refractive index. After exposing the liquid optical adhesive 16 to ultraviolet light, thereby causing the liquid optical adhesive 16 to cure into a solid optical adhesive 16, the solid optical adhesive has a fifth refractive index that is within +/−5% of the first refractive index of the photonic waveguides 130, 132. In some embodiments, during the exposing step, the fourth refractive index rises from about 0.01 to about 0.1 to the fifth refractive index.

The optical assembly 129 illustrated in FIG. 8 may form part of a larger system, such as a photonic integrated circuit.

FIG. 9A is a side elevation view of an optical assembly 155 including a first waveguide 102 that is a first D-shaped optical fiber 156, a second waveguide 104 that is a second D-shaped optical fiber 158, and an adhesive 16 for transmitting optical signals between the first D-shaped optical fiber 156 and the second D-shaped optical fiber 158 by evanescent coupling. Each D-shaped optical fiber 156, 158 includes a planar portion (i.e., a first planar portion 160 of the first D-shaped optical fiber 156 and a second planar portion 162 of the second D-shaped optical fiber 158) and the first planar portion 160 of the first D-shaped optical fiber 156 is positioned adjacent to the second planar portion 162 of the second D-shaped optical fiber 158 (i.e., the first D-shaped optical fiber 156 is inverted) for transmission of optical signals therebetween by evanescent coupling. The adhesive 16 is positioned between the first planar portion 160 and the second planar portion 162 to transmit optical signals and to couple the first D-shaped optical fiber 156 to the second D-shaped optical fiber 158. FIG. 9B is a cross-sectional view of the optical assembly 155 of FIG. 9A along line A-A.

Each of the first and second D-shaped optical fibers 156, 158 include a core region 18 that is surrounded along its length by a cladding 20. The core region 18 is off-center within the cladding 20 so that the core 18 is closer to the planar portions 160, 162 of the D-shaped optical fibers 156, 158.

The first and second planar portions 160, 162 are separated by a space S. While the space S is depicted as being a constant space between the planar portions 160, 162, the space S may vary, including being zero (i.e., the first and second planar portions 160, 162 touch in regions). The optical adhesive 16 fills the space S and may extend over end portions of the D-shaped optical fibers 156, 158. During fabrication, the optical adhesive 16 is introduced into the space S between the planar portions 160, 162 of the D-shaped optical fibers 156, 158 in liquid form and cured to a solid mechanical joint 164 using, for example, one or more of thermal energy, ultraviolet light, or pressure. The curing may take place, for example, by way of ultraviolet light that is shone onto the optical adhesive 16.

In some embodiments, the optical adhesive 16 is made to have a refractive index that is within +/−5% of the target refractive index value. In the embodiment illustrated in FIG. 9A, the target refractive index value is equal to the refractive index of the first D-shaped optical fiber 156, equal to the refractive index of the second D-shaped optical fiber 158, or between the refractive indexes of the first and second D-shaped optical fibers 156, 158 at a wavelength of 1310 nm when measured at 25° C. In other embodiments, the optical adhesive 16 has a refractive index within +/−3% of the target refractive index value. In still other embodiments, the optical adhesive 16 is made to have a refractive index within +/−2% of the target refractive index value. In still other embodiments, the optical adhesive 16 is made to have a refractive index within +/−1% of the target refractive index value.

As noted above, the optical adhesive 16 may include first monomers and second monomers. In some embodiments, the first and second D-shaped optical fibers 156, 158 have a first refractive index, the first monomers have a second refractive index that is higher than the first refractive index, and the second monomers have a third refractive index that is lower than the first refractive index. Thus, when combined, the liquid optical adhesive 16 has a fourth refractive index that is less than the first refractive index. After exposing the liquid optical adhesive to ultraviolet light, thereby causing the liquid optical adhesive 16 to cure into a solid optical adhesive 16, the solid optical adhesive 16 has a fifth refractive index that is within +/−5% of the first refractive index of the D-shaped optical fibers 156, 158. In some embodiments, during the exposing step, the fourth refractive index rises from about 0.01 to about 0.1 to the fifth refractive index.

FIG. 10A a side elevation view of an optical assembly 165 including a first waveguide 102 that is a D-shaped optical fiber 166, a second waveguide 104 that is a photonic waveguide 168, and an adhesive 16 for transmitting optical signals between the D-shaped optical fiber 166 and the photonic waveguide 168 by evanescent coupling. The D-shaped optical fiber 166 may be similar to the D-shaped optical fibers 156, 158 of FIG. 9A and includes a core region 18 that is surrounded along its length by a cladding 20. The core region 18 is off-center within the cladding 20 so that the core region 18 is closer to a planar portion 180 of the D-shaped optical fiber 166. The photonic waveguide 168 forms part of a multi-layer system 172 that includes a substrate 174, the photonic waveguide 168, and one or more planarization layers 176. In other embodiments, the multi-layer system 172 may include additional or fewer layers. FIG. 10B shows a cross-sectional end view of the optical assembly 165 of FIG. 10A along line A-A. The photonic waveguide 168 may include an inverse taper 178, as illustrated in FIG. 10C which is a cross-section taken along line B-B of FIG. 10A.

The D-shaped optical fiber 166 is inverted such that the planar portion 170 of the D-shaped optical fiber 166 faces the multi-layer system 172. The optical adhesive 16 is located between planar portion 170 of the D-shaped optical fiber 166 and the multi-layer system 172 for transmitting optical signals therebetween. The D-shaped optical fiber 166 and the multi-layer system 172 may be separated by a space S. While the space S is depicted as being a constant space between the D-shaped optical fiber 166 and the photonic waveguide 168, the space S may vary, including being zero (i.e., the planar portion 170 of the D-shaped optical fiber 166 and the multi-layer system 172 touch in regions). The optical adhesive 16 fills the space S and may extend over portions of the end face 167 of the D-shaped optical fiber 166 and the side of the multi-layer system 172, as illustrated in FIG. 10A.

During fabrication, the optical adhesive 16 is introduced into the space S between the planar portion 170 of the D-shaped optical fiber 166 and the multi-layer system 172 in liquid form and cured to a solid mechanical joint 179 using, for example, one or more of thermal energy, ultraviolet light, or pressure. The curing may take place, for example, by way of ultraviolet light that is shone onto the optical adhesive 16.

In some embodiments, the optical adhesive 16 is made to have a refractive index that is within +/−5% of the target refractive index value. In the embodiment illustrated in FIG. 10A, the target refractive index value is equal to the refractive index of the D-shaped optical fiber 166, equal to the refractive index of the photonic waveguide 168, or between the refractive index values of the D-shaped optical fiber 166 and the photonic waveguide 168 at a wavelength of 1310 nm when measured at 25° C. In other embodiments, the optical adhesive 16 has a refractive index within +/−3% of the target refractive index value. In still other embodiments, the optical adhesive 16 is made to have a refractive index within +/−2% of the target refractive index value. In still other embodiments, the optical adhesive 16 is made to have a refractive index within +/−1% of the target refractive index value.

As noted above, the optical adhesive 16 may include first monomers and second monomers. In some embodiments, the D-shaped optical fiber 166 and the photonic waveguide 168 have a first refractive index, the first monomers have a second refractive index that is higher than the first refractive index, and the second monomers have a third refractive index that is lower than the first refractive index. Thus, when combined, the liquid optical adhesive 16 has a fourth refractive index that is less than the first refractive index. After exposing the liquid optical adhesive 16 to ultraviolet light, thereby causing the liquid optical adhesive 16 to cure into a solid optical adhesive 16, the solid optical adhesive 16 has a fifth refractive index that is within +/−5% of the first refractive index of the D-shaped optical fiber 166 and the photonic waveguide 168. In some embodiments, during the exposing step, the fourth refractive index rises from about 0.01 to about 0.1 to the fifth refractive index.

The optical assembly 165 illustrated in FIG. 10A may form part of a larger system, such as a photonic integrated circuit.

Figure 11A:
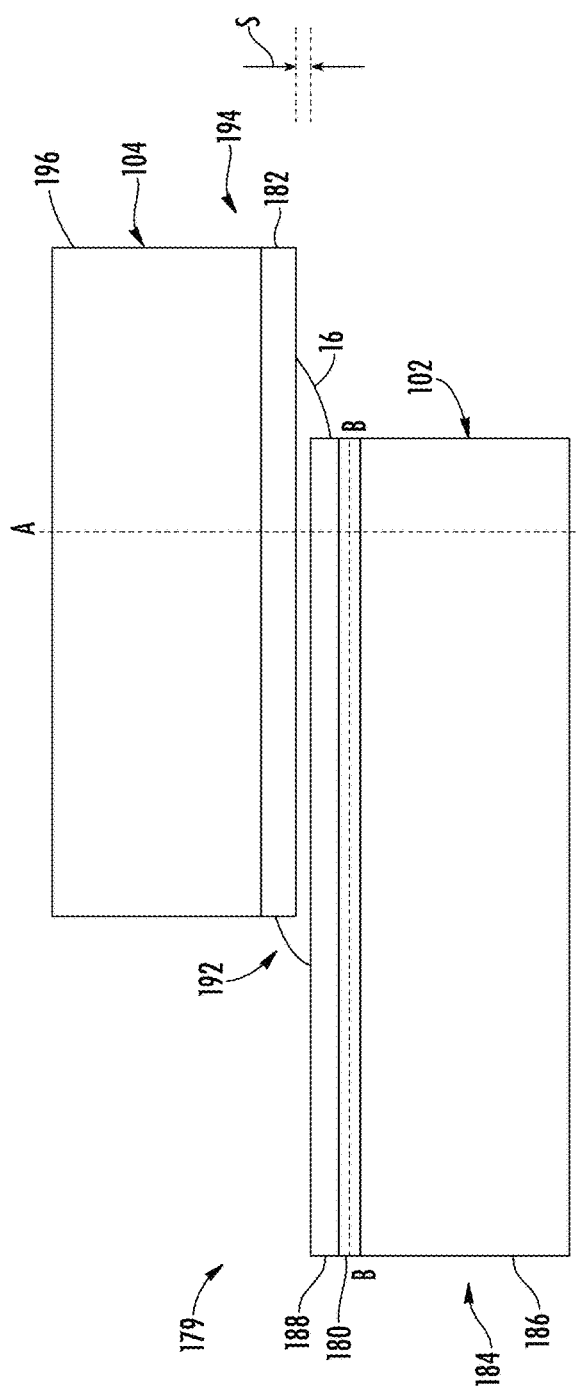
FIG. 11A is a side elevation view of an optical assembly including a first photonic waveguide, a second photonic waveguide, and an optical adhesive for transmitting optical signals between the first photonic waveguide and the second photonic waveguide by evanescent signal transmission according to an exemplary embodiment.
Figure 11C:
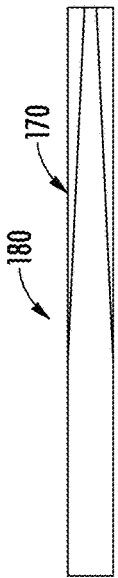
FIG. 11C is a cross-sectional view of the optical waveguide of FIG. 11A.
Figure 11B:
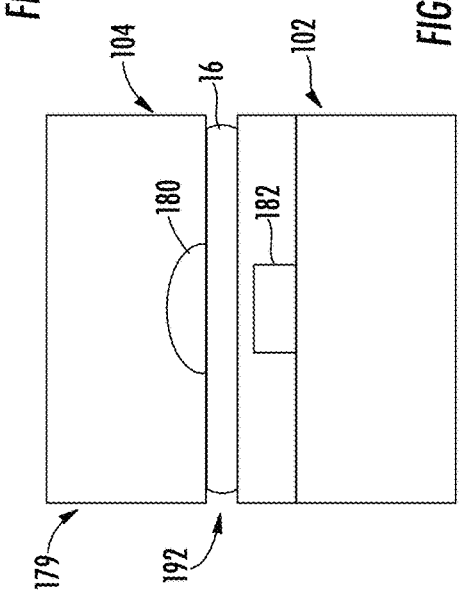
FIG. 11B is a cross-sectional view of the optical assembly of FIG. 11A.

FIG. 11A is a side elevation view of an optical assembly 179 including a first waveguide 102 that is a first photonic waveguide 180, a second waveguide 104 that is a second photonic waveguide 182, and an adhesive 16 for transmitting optical signals between the first photonic waveguide 180 and the second photonic waveguide 182 by evanescent coupling. FIG. 11B is a cross-sectional view of the optical assembly 179 of FIG. 11A taken along line A-A. FIG. 11C is a cross-sectional, top view of the second photonic waveguide 182 of FIG. 11A taken along line B-B.

The first photonic waveguide 180 forms part of a first multi-layer system 184 that includes a substrate 186, and the first photonic waveguide 180, and one or more planarization layers 188. The first photonic waveguide 180 includes an inverse taper 190 for allowing evanescent coupling of optical signals between the first photonic waveguide 180 and the second photonic waveguide 182.

The second photonic waveguide 182 forms part of a second multi-layer system 194 that includes a substrate 196 and the second photonic waveguide 182. The second photonic waveguide 182 is inverted and overlaps with the first photonic waveguide 180 so that the optical adhesive 16 is located between the first multi-layer system 184 and the second multi-layer system 194.

The first multi-layer system 184 and the second multi-layer system 194 may be separated by a space S. While the space S is depicted as being a constant space between the first multi-layer system 184 and the second multi-layer system 194, the space S may vary, including being zero (i.e., the first multi-layer system 184 and the second multi-layer system 194 touch in regions). The optical adhesive 16 fills the space S between the first multi-layer system 184 and the second multi-layer system 194. Further, the optical adhesive 16 may extend over portions of the sides of the first multi-layer system 184 and the second multi-layer system 194, as illustrated in FIG. 11A.

During fabrication, the optical adhesive 16 is introduced into the space S between the multi-layer systems 184, 194 in liquid form and cured to a solid mechanical joint 192 using, for example, one or more of thermal energy, ultraviolet light, or pressure. The curing may take place, for example, by way of ultraviolet light that is shone onto the optical adhesive 16.

In some embodiments, the optical adhesive 16 is made to have a refractive index that is within +/−5% of the target refractive index value. In the embodiment illustrated in FIG. 11A, the target refractive index value is equal to the refractive index of the photonic waveguide 180, equal to the refractive index of the photonic waveguide 182, or between the refractive indexes of the first and second photonic waveguides 180, 182 at a wavelength of 1310 nm when measured at 25° C. In other embodiments, the optical adhesive 16 has a refractive index within +/−3% of the target refractive index value. In still other embodiments, the optical adhesive 16 is made to have a refractive index within +/−2% of the target refractive index value. In still other embodiments, the optical adhesive 16 is made to have a refractive index within +/−1% of the target refractive index value.

As noted above, the optical adhesive 16 may include first monomers and second monomers. In some embodiments, the first and second photonic waveguides 180, 182 have a first refractive index, the first monomers have a second refractive index that is higher than the first refractive index, and the second monomers have a third refractive index that is lower than the first refractive index. Thus, when combined, the liquid optical adhesive 16 has a fourth refractive index that is less than the first refractive index. After exposing the liquid optical adhesive 16 to ultraviolet light, thereby causing the liquid optical adhesive 16 to cure into a solid optical adhesive 16, the solid optical adhesive 16 has a fifth refractive index that is within +/−5% of the first refractive index of the photonic waveguides. In some embodiments, during the exposing step, the fourth refractive index rises from about 0.01 to about 0.1 to the fifth refractive index.

The optical assembly illustrated in FIG. 6 may form part of a larger system, such as a photonic integrated circuit.

FIG. 12A is a cross-sectional, schematic side view of an optical assembly 201 including a first waveguide 102 that is an optical fiber 202, a second waveguide 104 that is a cantilever waveguide 204 with an integrated evanescent coupling to a photonic waveguide 222, and an adhesive 16 for transmitting optical signals between the optical fiber 202 and the cantilever waveguide 204. FIG. 12B is a cross-sectional, top view of the cantilever waveguide 204 of FIG. 12A taken along line A-A.

The optical fiber 202 may be similar to the optical fiber of FIG. 5A and includes a core region 18 that is surrounded along its length by a cladding 20. The cantilever waveguide 204 forms part of a multi-layer system 208 that includes a substrate 210 having a recess portion 212, the cantilever waveguide 204, and one or more planarization layers 203, 205. The multi-layer system 208 may include additional layers in other embodiments. Referring to FIG. 12B, the cantilever waveguide 204 includes a first inverse taper 214 for transmitting signals between the optical fiber 202 and the cantilever waveguide 204, and a second inverse taper 216 for transmitting signals from the cantilever waveguide 204 to the photonic waveguide 222 by evanescent coupling. The first inverse taper 214 forms part of the cantilever waveguide 204 and the second inverse taper 216 forms part of the photonic waveguide 222.

The optical fiber 202 has a first end face 218 that is aligned with a second end face 220 of the cantilever waveguide 204. In some embodiments, at least part of the optical adhesive 16 is located between the first end face 218 and the second end face 220 to facilitate transmission of optical signals between the optical fiber 202 and the cantilever waveguide 204. The first and second end faces 218, 220 are substantially aligned and are separated by a space S. While the space S is depicted as being a constant space between the end faces 218, 220, the space S may vary, including being zero (i.e., the end faces 218, 220 touch in regions), depending, e.g., on the geometry of the end faces 218, 220. The optical adhesive 16 fills the space S between the end faces 1218, 220. Further, the optical adhesive 16 may extend over other portions of the optical fiber 202 and the cantilever waveguide 204, as illustrated in FIG. 12A. In some embodiments, the optical adhesive 16 acts as a cladding material for the cantilever waveguide 204. To achieve guiding of the light as a cladding material, the optical adhesive 16 may have a refractive index less than the refractive index of the cantilevered waveguide 204. In fact, the adhesive 16 can be used to adjust the mode field diameter of the waveguide mode to better match that of the optical fiber.

In some embodiments, a first optical adhesive 16 is applied between the first end face 218 and the second end face 220 to facilitate transmission of optical signals between the optical fiber 202 and the cantilever waveguide 204, and a second optical adhesive 16 is applied around the cantilever waveguide to act as a cladding material. The first adhesive 16 may be made to have different properties than the second optical adhesive 16. For example, the first optical adhesive may be made to have a refractive index that is within +/−5% of the target refractive index value. In the embodiment illustrated in FIG. 12A, the target refractive index value is equal to the refractive index of the optical fiber 202, equal to the refractive index of the cantilever waveguide 204, or between the refractive indexes of the optical fiber 202 and the cantilever waveguide 204 at a wavelength of 1310 nm when measured at 25° C. The second optical adhesive may be made to have a refractive index that is less than the refractive index of the cantilevered waveguide 204.

During fabrication, the optical adhesive 16 is introduced into the space S between the optical fiber 202 and the cantilever waveguide 204 in liquid form and cured to a solid mechanical joint 224 using, for example, one or more of thermal energy, ultraviolet light, or pressure. The curing may take place, for example, by way of ultraviolet light that is shone onto the optical adhesive 16.

In some embodiments, the optical adhesive 16 is made to have a refractive index that is within +/−5% of the target refractive index value. In the embodiment illustrated in FIG. 12A, the target refractive index value is equal to the refractive index of the optical fiber 202, equal to the refractive index of the cantilever waveguide 204, or between the refractive indexes of the optical fiber 202 and the cantilever waveguide 204 at a wavelength of 1310 nm when measured at 25° C. In other embodiments, the optical adhesive 16 has a refractive index within +/−3% of the target refractive index value. In still other embodiments, the optical adhesive 16 is made to have a refractive index within +/−2% of the target refractive index value. In still other embodiments, the optical adhesive 16 is made to have a refractive index within +/−1% of the target refractive index value As noted above, the optical adhesive 16 may include first monomers and second monomers. In some embodiments, the optical fiber 202 and the cantilever waveguide 204 have a first refractive index, the first monomers have a second refractive index that is higher than the first refractive index, and the second monomers have a third refractive index that is lower than the first refractive index. Thus, when combined, the liquid optical adhesive 16 has a fourth refractive index that is less than the first refractive index. After exposing the liquid optical adhesive 16 to ultraviolet light, thereby causing the liquid optical adhesive 16 to cure into a solid optical adhesive 16, the solid optical adhesive 16 has a fifth refractive index that is within +/−5% of the first refractive index of the optical fiber 202 and the cantilever waveguide 204. In some embodiments, during the exposing step, the fourth refractive index rises from about 0.01 to about 0.1 to the fifth refractive index.

The optical assembly 201 illustrated in FIG. 12A may form part of a larger system, such as a photonic integrated circuit.

FIG. 13A is a side view of an optical assembly 225 including a first waveguide 102 that is an optical fiber 226, a second waveguide 104 that is a cantilever waveguide 228, a third waveguide 105 that is a photonic waveguide 230 having an inverse taper 232, and an adhesive 16 for transmitting optical signals between the optical fiber 226 and the cantilever waveguide 228 and between the cantilever waveguide 228 and the photonic waveguide 230 by evanescent coupling. FIG. 13B is a cross-sectional, top view of the photonic waveguide 230 of FIG. 13A taken along line A-A.

The optical fiber 226 may be similar to the optical fiber 46 of FIG. 5A and includes a core region 18 that is surrounded along its length by a cladding 20. The cantilever waveguide 228 forms part of a multi-layer system 234 that includes a substrate 236, the cantilever waveguide 228, and a cover layer 238. The multi-layer system 234 may include more or fewer layers in other embodiments. The substrate 236 and the cover layer 238 each include recesses 240 adjacent to the protruding portion 242 of the cantilever waveguide 228 which are filled with the adhesive 16. The photonic waveguide 230 is positioned adjacent to the non-protruding portion 244 of the cantilever waveguide 228. The phonic waveguide 230 includes an inverse taper 232 for evanescent coupling of optical signals between the cantilever waveguide 228 and the photonic waveguide 230.

The optical fiber 226 has a first end face 246 that is aligned with a second end face 248 of the cantilever waveguide 228. In some embodiments, at least part of the optical adhesive 16 is located between the first end face 246 and the second end face 248 to facilitate transmission of optical signals between the optical fiber 226 and the photonic waveguide 230. The first and second end faces 246, 248 are substantially aligned and are separated by a space S. While the space S is depicted as being a constant space between the end faces 246, 248, the space S may vary, including being zero (i.e., the end faces 246, 248 touch in regions). The optical adhesive 16 fills the space S between the end faces 246, 248 and may fill the recesses 240 in the substrate and cover layers 236, 238 of the multi-layer system 234. As such, the optical adhesive 16 may act as a cladding material for the protruding portion 242 of the cantilever waveguide 228. The adhesive 16 also fills an area between the cantilever waveguide 228 and the photonic waveguide 230 to facilitate evanescent coupling of optical signals between the cantilever waveguide 228 and the photonic waveguide 230.

During fabrication, the optical adhesive 16 is introduced into the area between the optical fiber 226, the cantilever waveguide 228, and the photonic waveguide 230 in liquid form and cured to a solid mechanical joint 250 using, for example, one or more of thermal energy, ultraviolet light, or pressure. The curing may take place, for example, by way of ultraviolet light that is shone onto the optical adhesive.

In some embodiments, the optical adhesive 16 is made to have a refractive index that is within +/−5% of the target refractive index value. In the embodiment illustrated in FIG. 13A, the target refractive index value is equal to the refractive index of the optical fiber 226, equal to the refractive index of the cantilever waveguide 228, equal to the refractive index of the photonic waveguide 230 or between the refractive indexes of the optical fiber 226, the cantilever waveguide 228 and the photonic waveguide 230 at a wavelength of 1310 nm when measured at 25° C. In other embodiments, the optical adhesive has a refractive index within +/−3% of the target refractive index value. In still other embodiments, the optical adhesive 16 is made to have a refractive index within +/−2% of the target refractive index value. In still other embodiments, the optical adhesive 16 is made to have a refractive index within +/−1% of the target refractive index value.

As noted above, the optical adhesive 16 may include first monomers and second monomers. In some embodiments, the optical fiber 226, the cantilever waveguide 228 and the photonic waveguide 230 have a first refractive index, the first monomers have a second refractive index that is higher than the first refractive index, and the second monomers have a third refractive index that is lower than the first refractive index. Thus, when combined, the liquid optical adhesive has a fourth refractive index that is less than the first refractive index. After exposing the liquid optical adhesive to ultraviolet light, thereby causing the liquid optical adhesive to cure into a solid optical adhesive, the solid optical adhesive has a fifth refractive index that is within +/−5% of the first refractive index. In some embodiments, during the exposing step, the fourth refractive index rises from about 0.01 to about 0.1 to the fifth refractive index.

The optical assembly illustrated in FIG. 12A may form part of a larger system, such as a photonic integrated circuit.

Figure 14:
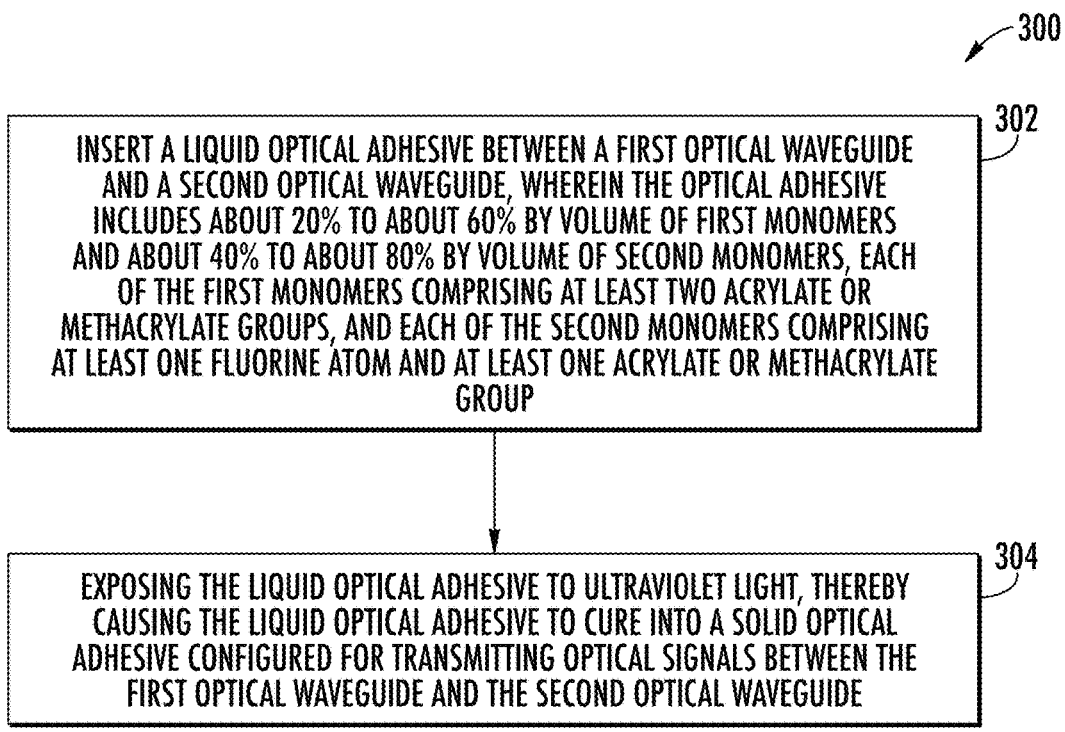
FIG. 14 illustrates a method of joining two optical waveguides according to an exemplary embodiment.

FIG. 14 illustrates a method 300 of joining two optical waveguides according to an exemplary embodiment. The method 300 includes providing a liquid optical adhesive 16 between a first optical waveguide 102 and a second optical waveguide 104, wherein the optical adhesive 16 includes about 20% to about 60% by volume of first monomers and about 40% to about 80% by volume of second monomers, each of the first monomers comprising at least two acrylate or methacrylate groups, and each of the second monomers comprising at least one fluorine atom and at least one acrylate or methacrylate group, as illustrated at block 302. The method 300 also includes exposing the liquid optical adhesive 16 to ultraviolet light, thereby causing the liquid optical adhesive 16 to cure into a solid optical adhesive 16 configured for transmitting optical signals between the first optical waveguide 102 and the second optical waveguide 104, as illustrated at block 304.

In some embodiments, the method 300 may also include positioning the first optical waveguide 102 and the second optical waveguide 104 such that a first longitudinal axis of the first optical waveguide is coaxial with a second longitudinal axis of the second optical waveguide and such that a first end face of the first optical waveguide faces a second end face of the second optical waveguide (see e.g., FIG. 1).

In some embodiments, the method 300 includes the first waveguide 102 further comprises a diffraction grating, and wherein the adhesive 16 is located between the second waveguide and the diffraction grating (see e.g., FIG. 7A).

In other embodiments, the method 300 includes positioning a first side portion of the first optical waveguide 102 adjacent to a second side portion of the second optical waveguide 104, and wherein the adhesive 16 is located between the first side portion of the first optical waveguide 102 and the second side portion of the second optical waveguide 104 (see e.g., FIG. 9A).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical assembly, comprising:
   a first waveguide;
   a second waveguide; and
   an optical adhesive for transmitting optical signals between the first waveguide and the second waveguide, wherein the optical adhesive comprises:
      20% to 60% by volume of first monomers, each of the first monomers comprising at least two acrylate or methacrylate groups;
      40% to 80% by volume of second monomers, each of the second monomers comprising at least one fluorine atom and at least one acrylate or methacrylate group;
   wherein, upon curing, the cured optical adhesive has a cured refractive index of from about 1.40 to about 1.55 at a wavelength of 1310 nm and at 25° C.; and
   wherein in the temperature range of about 10° C. to about 85° C., the cured refractive index of the cured optical adhesive has a thermal drift dn/dT of less than the absolute magnitude of $|4\times10^{-4}/°C.|$ and the sign of that value is negative.

2. The optical assembly of claim 1, wherein the first waveguide is a first optical fiber having a first end face and the second waveguide is a second optical fiber having a second end face, and wherein the optical adhesive is located between the first end face and the second end face.

3. The optical assembly of claim 1, wherein the first waveguide is an optical fiber having a first end face and the second waveguide is a photonic waveguide having a second end face, and wherein the optical adhesive is located between the first end face and the second end face.

4. The optical assembly of claim 1, wherein the first waveguide is a first photonic waveguide having a first end face and the second waveguide is a second photonic waveguide having a second end face, and wherein the optical adhesive is located between the first end face and the second end face.

5. The optical assembly of claim 1, wherein the first waveguide comprises a first end face and the second waveguide comprises a second end face and wherein the optical adhesive is located between the first end face and the second end face, and wherein the cured refractive index is within about +/−10% of a target refractive index value.

6. The optical assembly of claim 1, wherein the first waveguide comprises a first end face and the second waveguide comprises a second end face and wherein the optical adhesive is located between the first end face and the second end face, and wherein the cured refractive index is within about +/−2% of a target refractive index value.

7. The optical assembly of claim 1, wherein the first waveguide comprises a first end face and the second waveguide comprises a second end face and wherein the optical adhesive is located between the first end face and the second end face, and wherein the cured refractive index is within about +/−1% of a target refractive index value.

8. The optical assembly of claim 1, wherein the second waveguide is a cantilever waveguide and the optical adhesive at least partially surrounds the cantilever waveguide, wherein the cured refractive index is less than a refractive index of the cantilever waveguide such that the adhesive acts as a cladding material.

9. The optical assembly of claim 1, wherein the first waveguide further comprises a diffraction grating at a diffraction area, and wherein the optical adhesive is located between the second waveguide and the diffraction area.

10. The optical assembly of claim 9, wherein the optical adhesive is located between a second end of the second waveguide and the diffraction area.

11. The optical assembly of claim 10, wherein the cured refractive index is within about +/−10% of a target refractive index value.

12. The optical assembly of claim 10, wherein the cured refractive index is within about +/−2% of a target refractive index value.

13. The optical assembly of claim 10, wherein the cured refractive index is within about +/−1% of a target refractive index value.

14. The optical assembly of claim 1, wherein at least a portion of the first waveguide overlaps at least a portion of the second waveguide and the optical adhesive is positioned between overlapping portions of the first and second waveguides for transmitting optical signals between the first waveguide and the second waveguide by evanescent coupling.

15. The optical assembly of claim 14, wherein the cured optical adhesive has a refractive index that is within about +/−5% of a target refractive index value.

16. The optical assembly of claim 14, wherein the cured optical adhesive has a refractive index that is within about +/−2% of a target refractive index value.

17. The optical assembly of claim 14, wherein the cured optical adhesive has a refractive index that is within about +/−1% of a target refractive index value.

18. The optical assembly of claim 1, wherein the optical adhesive further comprises an adhesion promotor to help bond the first waveguide to the second waveguide.

19. The optical assembly of claim 1, further comprising an adhesion promotor applied to one or both of the first and second waveguides.

20. The optical assembly of claim 1, wherein the optical adhesive further comprises about 1% to about 30% by weight of nanoparticles, the nanoparticles having, on average, a longest cross-sectional dimension of from about 5 nm to about 50 nm.

21. The optical assembly of claim 20, wherein the nanoparticles comprise a polymerizable surface treatment comprising a acrylate or methacrylate group.

22. The optical assembly of claim 20, wherein the nanoparticles are coated with at least one functional group.

23. The optical assembly of claim 20, wherein the nanoparticles comprise silica.

24. The optical assembly of claim 1, wherein the first monomers comprise at least one of 1,4-butanediol diacrylate, 1,4-butanediol dimethacrylate, 1,3-butanediol diacrylate, 2,2,3,3-tetrafluoro-1,4-butanediol diacrylate, or 2,2,3,3-tetrafluoro-1,4-butanediol dimethacrylate.

25. The optical assembly of claim 1, wherein the second monomers comprise at least one of 1,1,1,3,3,3-hexafluoroisopropyl methacrylate, 2,2,2-trifluoroethyl methacrylate, 2,2,3,3,4,4,5,5-octafluoropentyl methacrylate, or 2,2,3,3-tetrafluoropropyl methacrylate.

26. The optical assembly of claim 1, wherein the optical adhesive further comprises an anti-oxygen inhibition additive.

27. The optical assembly of claim 1, wherein at least a portion of the first monomers comprise at least one fluorine atom.

28. The optical assembly of claim 1, wherein the optical adhesive further comprises from about 0.1 to about 10% by volume of a photoinitiator or thermal initiator or admixture of a photoinitiator and thermal initiator.

29. An optical assembly, comprising:
a first waveguide;
a second waveguide; and
an optical adhesive for transmitting optical signals between the first waveguide and the second waveguide and for forming a mechanical joint between the first waveguide and the second waveguide, wherein the optical adhesive comprises a cured mixture of:
20% to 60% by volume of first monomers, each of the first monomers comprising at least two acrylate or methacrylate groups; and
40% to 80% by volume of second monomers, each of the second monomers comprising at least one fluorine atom and at least one acrylate or methacrylate group; and
wherein a return loss across the mechanical joint is less than −40 dB as measured at a wavelength of 1310 nm.

30. The optical assembly of claim 29, wherein:
the first waveguide has a first longitudinal axis, and wherein the first waveguide comprises a first core region and a first cladding region, and wherein the first waveguide has a first end face transverse to the first longitudinal axis;
the second waveguide having a second longitudinal axis, and wherein the second waveguide comprises a second core region and a second cladding region, wherein the second waveguide has a second end face transverse to the second longitudinal axis, and wherein the first waveguide is arranged with the second waveguide such that the first longitudinal axis is coaxial with the second longitudinal axis and such that the first end face faces the second end face; and
wherein the optical adhesive is bonded to the first end face and to the second end face.

31. The optical assembly of claim 29, wherein the optical adhesive is also bonded to a least a portion of an outer surface of the first cladding region and to at least a portion of an outer surface of the second cladding region.

32. The optical assembly of claim 29, wherein the first waveguide comprises a first diffraction grating and the second waveguide comprises a second diffraction grating, and wherein the optical adhesive is located between the first diffraction grating and the second diffraction grating.

33. The optical assembly of claim 29, wherein at least a portion of the first waveguide overlaps at least a portion of the second waveguide and the optical adhesive is positioned between overlapping portions of the first and second waveguides for transmitting optical signals between the first waveguide and the second waveguide by evanescent coupling.

34. A method of joining two waveguides, the method comprising the steps of:
inserting a liquid optical adhesive between a first waveguide and a second waveguide, wherein the liquid optical adhesive comprises about 20% to about 60% by volume of first monomers and about 40% to about 80%° by volume of second monomers, each of the first monomers comprising at least two acrylate or methacrylate groups, and each of the second monomers comprising at least one fluorine atom and at least one acrylate or methacrylate group;
exposing the liquid optical adhesive to ultraviolet light, thereby causing the liquid optical adhesive to cure into a solid optical adhesive configured for transmitting optical signals between the first waveguide and the second waveguide.

35. The method of claim 34, further comprising positioning the first waveguide and the second waveguide such that a first longitudinal axis of the first waveguide is coaxial with a second longitudinal axis of the second waveguide and such that a first end face of the first waveguide faces a second end face of the second waveguide.

36. The method of claim 34, wherein the first waveguide comprises a first diffraction grating and the second waveguide comprises a second diffraction grating, and wherein the optical adhesive is located between the first and second diffraction gratings.

37. The method of claim 34, further comprising overlapping at least a portion of the first waveguide with at least a portion of the second waveguide, wherein the adhesive is positioned between overlapping portions of the first and second waveguides.

* * * * *